United States Patent
Tian et al.

(10) Patent No.: US 12,455,672 B2
(45) Date of Patent: Oct. 28, 2025

(54) INTERACTION METHOD FOR CROSS-DEVICE TASK PROCESSING, ELECTRONIC DEVICE, AND STORAGE MEDIUM

(71) Applicant: Huawei Technologies Co., Ltd., Shenzhen (CN)

(72) Inventors: Long Tian, Shanghai (CN); Whan Woong Kim Stransom, Shenzhen (CN); Jie Xu, Shanghai (CN); Liping He, Shanghai (CN); Yueqi Wang, Shanghai (CN); Haowei Liang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/791,428

(22) PCT Filed: Jan. 8, 2021

(86) PCT No.: PCT/CN2021/070862
§ 371 (c)(1),
(2) Date: Jul. 7, 2022

(87) PCT Pub. No.: WO2021/139768
PCT Pub. Date: Jul. 15, 2021

(65) Prior Publication Data
US 2023/0041287 A1 Feb. 9, 2023

(30) Foreign Application Priority Data
Jan. 8, 2020 (CN) .......................... 202010019454.9

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0486* (2013.01); *G06F 9/4856* (2013.01)

(58) Field of Classification Search
CPC .... G06F 3/0482; G06F 3/0486; G06F 9/4856; G06F 3/04883; G06F 9/452;
(Continued)

(56) References Cited

U.S. PATENT DOCUMENTS 9,990,129 B2    6/2018   Yang et al.
11,132,212 B2   9/2021   Pierce et al.
(Continued)

FOREIGN PATENT DOCUMENTS

CN      104090818 A    10/2014
CN      105324754 A    2/2016
(Continued)

*Primary Examiner* — Aleksey Olshannikov
(74) *Attorney, Agent, or Firm* — SLATER MATSIL, LLP

(57) ABSTRACT

An interaction method, including displaying, by a first electronic device, a multi-task management interface, including N device labels corresponding to N electronic devices and including a first, second and third device label of the first, second and third electronic device, receiving a first operation for dragging the first task record to the second device label performed by a user on a first task record, enabling, in response to the first operation, the second electronic device to display at least one first task corresponding to the first task record, receiving a second operation for dragging the second task record to the third device label performed by a user on a second task record in the multi-task management interface, and enabling, by the first electronic device in response to the second operation, the third electronic device to display at least one of second task corresponding to the second task record.

23 Claims, 28 Drawing Sheets

(51) Int. Cl.
*G06F 3/0486* (2013.01)
*G06F 9/48* (2006.01)

(58) Field of Classification Search
CPC ......... G06F 2203/04803; G06F 3/0483; G06F 3/0481; G06F 9/4881
See application file for complete search history.

(56) References Cited

U.S. PATENT DOCUMENTS

| | | | |
|---|---|---|---|
| 11,228,640 B2 | 1/2022 | Singh et al. | |
| 11,449,358 B2 | 9/2022 | Gupta | |
| 2010/0082784 A1* | 4/2010 | Rosenblatt | H04L 67/10 709/222 |
| 2010/0149096 A1* | 6/2010 | Migos | G06F 3/0425 345/158 |
| 2011/0320626 A1 | 12/2011 | Wong et al. | |
| 2012/0254793 A1* | 10/2012 | Briand | H04N 21/43615 715/781 |
| 2014/0359493 A1* | 12/2014 | Hong | G06F 3/1454 715/761 |
| 2015/0032889 A1 | 1/2015 | Chan et al. | |
| 2017/0054767 A1* | 2/2017 | Goldsmith | H04L 65/1083 |
| 2017/0235435 A1* | 8/2017 | Sohn | G06F 3/0481 715/738 |
| 2018/0121082 A1 | 5/2018 | Zhu et al. | |
| 2023/0041287 A1 | 2/2023 | Tian et al. | |

FOREIGN PATENT DOCUMENTS

| | | |
|---|---|---|
| CN | 106415431 A | 2/2017 |
| CN | 106687932 A | 5/2017 |
| CN | 107851035 A | 3/2018 |
| CN | 110268377 A | 9/2019 |
| CN | 110392881 A | 10/2019 |
| CN | 110825709 A | 2/2020 |
| CN | 111142818 A | 5/2020 |
| CN | 111240547 A | 6/2020 |
| EP | 2770414 A2 | 8/2014 |
| JP | 2018526695 A | 9/2018 |
| WO | 2017030662 A1 | 2/2017 |

\* cited by examiner

INTERACTION METHOD FOR CROSS-DEVICE TASK PROCESSING, ELECTRONIC DEVICE, AND STORAGE MEDIUM

CROSS REFERENCE TO RELATED APPLICATIONS

This application is a national stage of International Application No. PCT/CN2021/070862, filed on Jan. 8, 2021, which claims priority to Chinese Patent Application No. 202010019454.9, filed on Jan. 8, 2020. Both of the aforementioned applications are hereby incorporated by reference in their entireties.

TECHNICAL FIELD

This application relates to the field of cross-device task processing technologies, and specifically, to an interaction method for cross-device task processing. In addition, this application further relates to an electronic device and a computer-readable storage medium.

BACKGROUND

As a user has more and more intelligent devices, cross-device task processing implemented between different devices is restricted by different systems and platform barriers to different degrees, and this causes inconvenience to the user.

For example, a user browses a web page on a mobile phone, and if the user wants to continue browsing the web page on a computer subsequently, the user usually needs to copy a website address of the web page in a browser on the mobile phone, then opens an application such as QQ or WeChat, opens a user interface such as "My computer" or "File transfer" in the application, and paste the website address of the web page in the user interface. Then, the user opens an application such as QQ or WeChat on the computer of the user, logs in to the application with a same application account, copies the received website address of the web page and then pastes the address into a browser on the computer, and finally opens the web page on the computer. It can be learned that, to browse the same web page across devices, intermediate operation steps are very complex, and this causes inconvenience to the user.

A handoff (apple handoff) function is a function developed by Apple Inc. to implement cross-device task processing, and the function allows a user to start a task on one device, and continue processing the task on another nearby device. For example, if a user opens a browser on a device A (for example, a mobile phone) to browse a web page, a temporary browser label appears on a left side of a taskbar on another device B (for example, a computer) near the device A. If clicking the browser label on the device B, the user can open the web page just browsed on the device A, so as to continue browsing the web page.

However, the handoff function allows the user only to passively select, on the device B, a task on the device A that is pushed by a background of the device B for continue processing, but cannot actively select, on the device B, a task on the device A. This still causes inconvenience to the user and affects user experience.

SUMMARY

This application provides an interaction method for cross-device task processing and an electronic device, to improve convenience of performing cross-device task processing by a user, and improve user experience.

According to a first aspect, this application provides an interaction method for cross-device task processing. The method includes: A first electronic device displays a multi-task management interface. The multi-task management interface includes one or more device labels, and each device label corresponds to one electronic device, that is, one or more device labels correspond to one or more electronic devices. The multi-task management interface further includes at least one task record, and each task record may record one or more tasks running on an electronic device, that is, each task record corresponds to one or more tasks. The method further includes: The first electronic device receives a sharing operation performed by a user on a first task record in the multi-task management interface. The first electronic device enables, in response to the sharing operation, a target device to display at least one task corresponding to the first task record. Any one of the one or more electronic devices is used as a source device (namely, an electronic device on which a task that the user expects to process across devices is originally located), another electronic device different from the source device is used as a target device (namely, an electronic device that continues running the task on the source device when cross-device task processing is processed), and any one of task records of the source device is used as the first task record (namely, a task record corresponding to the task that the user expects to process across devices). The first electronic device enables, in response to the sharing operation performed by the user on the first task record, the target device to display the at least one task corresponding to the first task record. The sharing operation is mainly used to enable the target device to display the task corresponding to the first task record. In other words, the first electronic device displays the multi-task management interface to the user, so that the user can view the appropriate source device, the first task record of the source device, and the target device. After the user performs the sharing operation on the first task record, the first electronic device enables, based on the sharing operation, the target device to display one or more tasks corresponding to the first task record.

In this implementation, the user can view a historical task record of the source device in the multi-task management interface of the first electronic device, can actively select one or more tasks on the source device, and enable the target device to display the one or more tasks, thereby implementing cross-device task processing. This is very convenient, and provides simple, direct, and easy-to-use interaction experience for the user.

When the sharing operation is implemented in different forms, different target devices are enabled to display the task corresponding to the first task record. In a possible implementation, the first electronic device is used as the target device. When a second operation is performed on the first task record in the multi-task management interface, the first electronic device is enabled to display one or more tasks on another electronic device, thereby conveniently implementing cross-device task processing. The implementation may be specifically as follows: The first electronic device displays, in response to the second operation performed by the user on the first task record, the at least one task corresponding to the first task record. In another possible implementation, the one or more electronic devices include at least one second electronic device, and any second electronic device is used as the target device. When a third operation is performed on the first task record and a device label corresponding to the second electronic device in the multi-task management interface, the second electronic device is enabled to display one or more tasks on the first electronic device, or display one or more tasks on another second electronic device. This implementation can conveniently implement cross-device task processing, so that the user can select a more appropriate electronic device to process the task. The implementation may be specifically as follows: The first electronic device enables, in response to the third operation performed by the user on the first task record and the device label corresponding to the second electronic device, the second electronic device corresponding to the third operation to display the at least one task corresponding to the first task record.

When the sharing operation is implemented in different forms, the target device is enabled to display the task corresponding to the first task record in different display manners. In a possible implementation, the user may perform, in the task management interface, a split-screen operation on a task record of the source device and a device label corresponding to the target device, so that a task running in a foreground of the target device and a task on the source device are displayed on the target device in a split-screen manner. The implementation may be specifically as follows: The first electronic device enables, in response to the split-screen operation performed by the user on the first task record and the device label corresponding to the target device, the target device to display, in the split-screen form, the at least one task corresponding to the first task record and the task running in the foreground of the target device. This implementation implements cross-device processing of the task on the source device, simplifies operation steps of implementing split-screen display of the task on the source device and the task on the target device, and improves user experience. In another possible implementation, the user may perform, in the task management interface, a transmission operation on a file in the task record of the source device and the device label corresponding to the target device, thereby implementing transmission of the file in the task record. The implementation may be specifically as follows: The first electronic device enables, in response to the transmission operation performed by the user on the file in the first task record and the device label corresponding to the target device, the target device to receive the file. This implementation can be used to transmit the file on the source device to the target device, so that the user can continue processing, on the target device, the file on the source device, thereby simplifying operation steps and improving user experience.

In a possible implementation, when the first task record corresponds to at least two related tasks, and the sharing operation is performed in the multi-task management interface of the first electronic device, the tasks displayed in a split-screen form on the source device are still displayed in a split-screen form on the target device, thereby conveniently implementing cross-device processing of a plurality of tasks. The implementation may be specifically as follows: The first electronic device enables, in response to the sharing operation, the target device to display the at least two related tasks in the split-screen form, where the related tasks are tasks displayed in a split-screen form on the source device.

In a possible implementation, the user may conveniently evoke the multi-task management interface of the first electronic device by using a first operation, so as to perform a subsequent operation step. The implementation may be specifically as follows: The first electronic device receives the first operation performed by the user. The first electronic device displays the multi-task management interface in response to the first operation.

In a possible implementation, after invoking the multi-task management interface, the user may perform a selection operation on a device label in the multi-task management interface, to view task records of different electronic devices, so as to select a task that needs to be processed across devices. The implementation may be specifically as follows: The first electronic device receives the selection operation performed by the user on the device label, and displays at least one task record of an electronic device corresponding to the selected device label.

When there are a plurality of device labels selected in the multi-task management interface, historical task records of a plurality of electronic devices are displayed in the multi-task management interface, so that the user can globally view the task records of the plurality of devices. The task records of the plurality of devices can be displayed in different manners. In a possible implementation, the multi-task management interface may display the task records of the plurality of electronic devices in an application dimension. The implementation may be specifically as follows: When more than one device label is selected in the multi-task management interface, and at least one same application is installed on the electronic devices respectively corresponding to the selected device labels, the multi-task management interface displays, by category based on the at least one same application, the task records of the electronic devices respectively corresponding to the selected device labels. In this implementation, the user can view the task records of the plurality of electronic devices in the application dimension, and when viewing tasks that are on a plurality of different devices and that are opened by using the same applications, the user can further conveniently compare progresses of the tasks on the different devices, thereby improving efficiency of viewing and selecting, by the user, the task that needs to be processed across devices. In another possible implementation, the multi-task management interface may display the task records of the plurality of devices in a task time sequence. The implementation may be specifically as follows: When more than one device label is selected on the multi-task management interface, the multi-task management interface displays, in a time sequence, the task records of the electronic devices respectively corresponding to the selected device labels. In this implementation, the user can view the task records of the plurality of electronic devices in the time sequence, thereby conveniently determining the task that needs to be processed across devices, and improving viewing and selection efficiency of the user.

A privacy setting operation may be performed on a device label in the multi-task management interface of the first electronic device, so that some or all of the second electronic devices skip displaying a historical task record of the first electronic device, thereby meeting a temporary privacy requirement of the first electronic device. In a possible implementation, the device labels in the multi-task management interface include a first label corresponding to the first electronic device and at least one second label corresponding to the second electronic device. The method further includes: The first electronic device enables, in response to an eighth operation performed by the user on the at least one second label, the second electronic device corresponding to the second label corresponding to the eighth operation to skip displaying the task record of the first electronic device. In this implementation, the user of the first electronic device can perform the eighth operation on the second label to perform privacy setting, so as to restrict the second electronic device corresponding to the second label from viewing the historical task record of the first electronic device, thereby meeting the privacy requirement of the first electronic device. In another possible implementation, the device labels in the multi-task management interface include a first label corresponding to the first electronic device and at least one second label corresponding to the second electronic device. The method further includes: The first electronic device enables, in response to a ninth operation performed by the user on the first label, all the second electronic devices to skip displaying the task record of the first electronic device. In this implementation, the user of the first electronic device can perform the ninth operation on the first label to perform privacy setting, so as to restrict another device from viewing the historical task record of the first electronic device, thereby meeting the privacy requirement of the first electronic device.

According to a second aspect, this application provides an electronic device. The electronic device includes at least one input/output module and at least one processing module. The at least one input/output module is configured to: display a multi-task management interface, and receive a sharing operation performed by a user on a first task record in the multi-task management interface. The multi-task management interface includes one or more device labels, and each device label corresponds to one electronic device, that is, one or more device labels correspond to one or more electronic devices. The multi-task management interface further includes at least one task record, and each task record corresponds to one or more tasks. The at least one processing module is configured to enable, in response to the sharing operation, a target device to display at least one task corresponding to the first task record. Any one of the one or more electronic devices is used as a source device (namely, an electronic device on which a task that the user expects to process across devices is originally located), another electronic device different from the source device is used as a target device (namely, an electronic device that continues running the task on the source device when cross-device task processing is processed), and any one of task records of the source device is used as the first task record (namely, a task record corresponding to the task that the user expects to process across devices). The at least one processing module enables, in response to the sharing operation performed by the user on the first task record, the target device to display the at least one task corresponding to the first task record. In other words, the at least one input/output module displays the multi-task management interface to the user, and receives the operation performed by the user in the multi-task management interface, so that the user can view the appropriate source device, the first task record of the source device, and the target device, and perform an operation to implement cross-device task processing. The at least one processing module performs processing based on the operation entered by the user, so that the target device displays one or more tasks corresponding to the first task record.

According to a third aspect, this application provides an electronic device. The electronic device includes at least one input/output apparatus, at least one memory, and at least one processor. The at least one memory stores one or more instructions. When the one or more instructions are executed by the at least one processor, the electronic device is enabled to implement any method in the first aspect.

According to a fourth aspect, this application provides a computer-readable storage medium. The computer storage medium includes instructions or computer programs. When the instructions or the computer programs are run on an electronic device, the electronic device is enabled to perform any method according to the first aspect.

According to a fifth aspect, this application provides an interaction method for cross-device task processing. The method includes: A first electronic device displays a multi-task management interface. The multi-task management interface includes a first label corresponding to the first electronic device, a second label corresponding to a second electronic device, and at least one task record of the first electronic device. The task record herein corresponds to at least one task running on the first electronic device. The method further includes: The first electronic device receives an operation of dragging, by a user, a first task record of the first electronic device in the at least one task record to the second label. The first electronic device enables, in response to the operation of dragging the first task record to the second label, the second electronic device to display the first task. The first task record corresponds to a first task running on the first electronic device. In other words, the user can drag, in the multi-task management interface of the first electronic device, the task record corresponding to the task on the first electronic device that the user expects to process across devices to the device label corresponding to the second electronic device, so that the second electronic device can display the task on the first electronic device.

According to a sixth aspect, this application provides an interaction method for cross-device task processing. The method includes: A first electronic device displays a multi-task management interface. The multi-task management interface includes a first label corresponding to the first electronic device, a second label corresponding to a second electronic device, and at least one task record of the second electronic device. The task record herein corresponds to at least one task running on the second electronic device. The method further includes: The first electronic device receives a tap operation performed by a user on a first task record of the second electronic device in the at least one task record. The first electronic device obtains, in response to the tap operation on the first task record, data required for running the first task, and executes the first task. The first task record corresponds to a first task running on the second electronic device In other words, the user may tap, in the multi-task management interface of the first electronic device, the task record corresponding to the task on the second electronic device that the user expects to process across devices, so that the first electronic device can display the task on the second electronic device.

It may be understood that the electronic devices in the second aspect and the third aspect, and the computer-readable storage medium in the fourth aspect are all configured to perform the corresponding method provided above. For beneficial effects that can be achieved by the electronic devices and the computer-readable storage medium, refer to beneficial effects of the corresponding method provided above. Details are not described herein again. The interaction methods in the fifth aspect and the sixth aspect are respectively two implementations of the method provided above. For beneficial effects that can be achieved by the interaction methods, refer to beneficial effects of a part of the foregoing method. Details are not described herein again.

BRIEF DESCRIPTION OF THE DRAWINGS

To describe technical solutions of this application more clearly, the following briefly describes accompanying drawings in embodiments.

DETAILED DESCRIPTION OF ILLUSTRATIVE EMBODIMENTS

In addition to the foregoing problem that the task on the device A cannot be actively selected on the device B, the following problem is caused. The handoff function allows the device B to push only an ongoing task on the device A to the user, and therefore the user cannot continue processing, on the device B, a currently closed task on the device A, that is, scalability of the handoff function is poor. This also affects user's use convenience. Therefore, embodiments of this application provide an interaction method for cross-device task processing, to improve convenience of performing cross-device task processing by a user.

Figure 1:
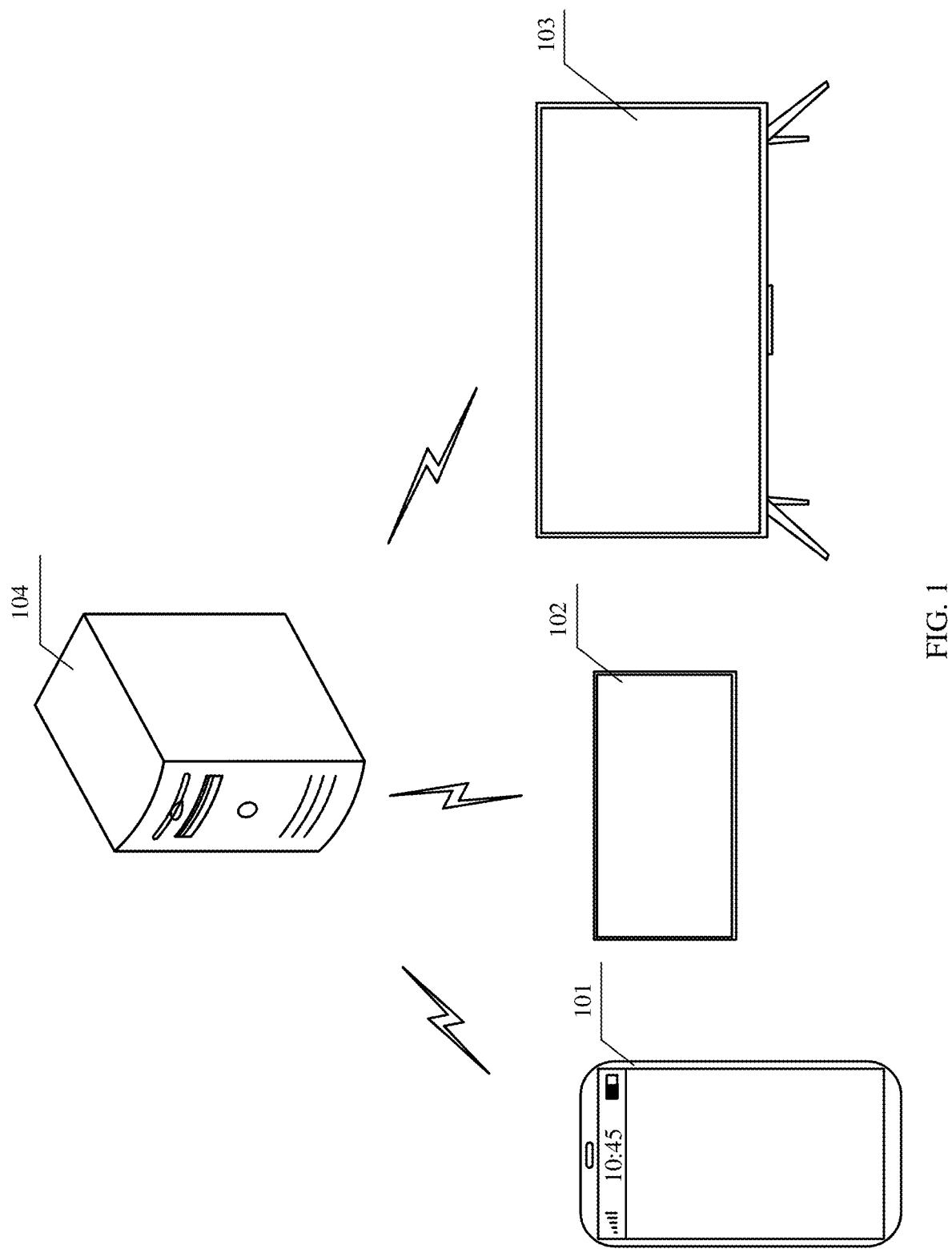
FIG. 1 is a schematic diagram of an architecture of a multi-device system to which an embodiment of this application is applied.

FIG. 1 is a schematic diagram of an architecture of a multi-device system to which an embodiment of this application is applied. The system may include at least two electronic devices. For example, in FIG. 1, the multi-device system includes a device 101, a device 102, and a device 103.

The electronic device in this embodiment of this application includes but is not limited to a mobile phone (mobile phone), a tablet computer (Pad), a personal computer, a virtual reality (virtual reality, VR) terminal device, an augmented reality (augmented reality, AR) terminal device, a wearable device, a television, a vehicle-mounted terminal device, and the like. In the example shown in FIG. 1, the device 101 is a mobile phone, the device 102 is a tablet computer, and the device 103 is a television.

The electronic device in this embodiment of this application has an input/output apparatus, so as to receive operation instructions entered by a user through operations, and display information to the user. The input/output apparatus may be a plurality of independent apparatuses. For example, the input apparatus may be a keyboard, or a mouse, and the output apparatus may be a display. The input/output apparatus may also be integrated into an apparatus, for example, may be a touchscreen. A form of the input/output apparatus is not limited in this application.

The input/output apparatus may display a user interface (user interface, UI), so as to interact with the user. The "user interface" is a medium interface for interaction and information exchange between an application or an operating system and the user, and implements conversion between an internal form of information and a form that can be accepted by the user. Usually, a user interface of an application is source code written in a specific computer language such as Java or an extensible markup language (extensible markup language, XML). Interface source code is parsed and rendered on a terminal device, and is finally presented as user-recognizable content, for example, a control such as a picture, a text, or a button. A control (control), also referred to as a widget (widget), is a basic element in the user interface. Typical controls include a toolbar (toolbar), a menu bar (menu bar), a text box (text box), a button (button), a scrollbar (scrollbar), a photo, and a text. Attributes and content of the controls in the user interface are defined by labels or nodes. For example, controls included in an interface are defined by nodes such as <Textview>, <ImgView>, and <VideoView> in the XML. One node corresponds to one control or one attribute in the user interface. After parsing and rendering, the node is presented as user-visible content. In addition, the user interface of many applications, such as hybrid applications (hybrid applications), usually further include a web page. A web page, also referred to as a page, may be understood as a special control embedded in a user interface of an application. The web page is source code written in a specific computer language, such as a hypertext markup language (hypertext markup language, HTML), a cascading style sheet (cascading style sheet, CSS), or JavaScript (JavaScript, JS). Web page source code may be loaded and displayed as user-recognizable content by a browser or a web page display component with a function similar to a function of the browser. Specific content included in the web page is also defined by using a label or a node in the web page source code. For example, an HTML defines an element and an attribute of the web page by using <p>, <img>, <video>, or <canvas>.

The user interface is usually in a representation form of a graphical user interface (graphic user interface, GUI), and is a user interface that is related to an operation of the electronic device and that is displayed in a graphical manner. The user interface may be an interface element such as a window, or a control displayed on a display of the electronic device, and the control may include a visual interface element such as an icon, a button, a menu, a tab, a text box, a dialog box, a status bar, a navigation bar, or a widget.

Figure 2A:
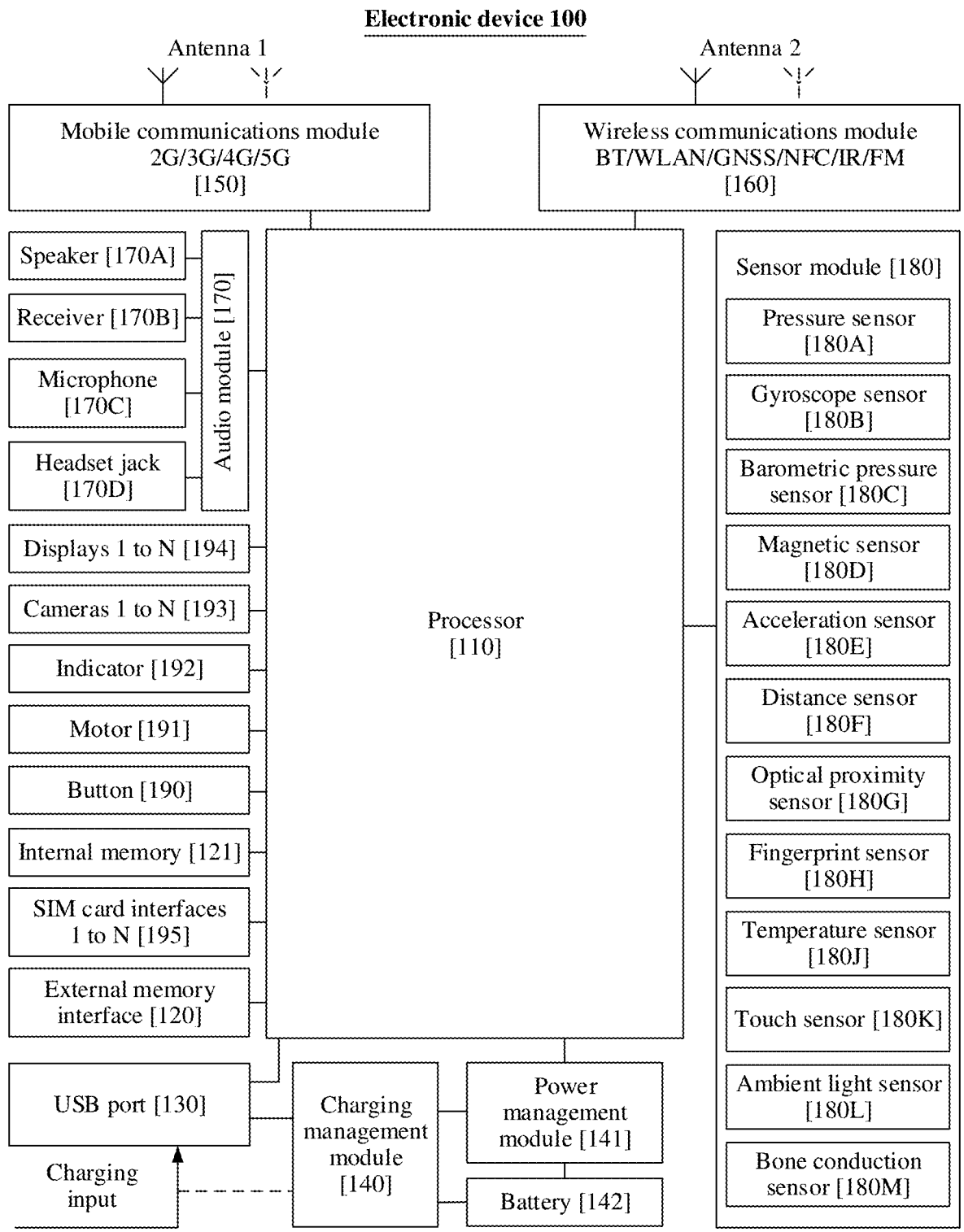
FIG. 2A is a schematic diagram of a structure of an example of an electronic device according to this application.

The following describes an example of an electronic device 100 provided in embodiments of this application. The device 101, the device 102, or the device 103 in FIG. 1 may be electronic devices of a same or similar structure as a structure of electronic device 100. FIG. 2A is a schematic diagram of the structure of the example of the electronic device according to this application.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this application does not constitute a specific limitation on the electronic device 100. In some other embodiments of this application, the electronic device 100 may include more or fewer components than the components shown in the figure, some components may be combined, or some components may be split, or different component arrangements may be used. The components shown in the figure may be implemented through hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors. In some embodiments, the electronic device 100 may alternatively include one or more processors 110.

The controller may be a nerve center and a command center of the electronic device 100. The controller may generate an operation control signal based on instruction operation code and a time sequence signal, to complete control of instruction detection.

A memory may be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, so that efficiency of the electronic device 100 is improved.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronous serial bus, including a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be used to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be used to perform the audio communication.

The UART interface is a universal serial data bus, and is used to perform asynchronous communication. The bus may be a two-way communications bus. The bus switches to-be-transmitted data between serial communication and parallel communication. In some embodiments, the UART interface is usually used to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through the Bluetooth headset.

The MIPI interface may be used to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through a CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may be configured as the I2C interface, the I2S interface, the UART interface, the MIPI interface, or the like.

The USB port 130 is a port that conforms to a USB standard specification, and may be specifically a mini USB port, a micro USB port, a USB Type C port, or the like. The USB port 130 may be used to connect to the charger to charge the electronic device 100, or may be used to transmit data between the electronic device 100 and a peripheral device, or may be used to connect to a headset, to play audio through the headset. The port may be used to connect to another electronic device such as an AR device.

It may be understood that an interface connection relationship between modules illustrated in this application is merely an example for description, and does not constitute a limitation on the structure of the electronic device 100. In some other embodiments, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB port 130. In some embodiments in which wireless charging is used, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input from the battery 142 and/an input from the charging management module 140, and supplies power to the processor 110, the internal memory 121, an external memory, the display 194, the camera 193, the wireless communications module 160, and the like. The power management module 141 may be configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. After the low-frequency baseband signal is processed by the baseband processor, a processed low-frequency baseband signal is transmitted to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same device as the mobile communications module 150 or another function module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite-based augmentation system, SBAS).

In some embodiments, the wireless communication solution provided by the mobile communications module 150 may enable the electronic device to communicate with a device (for example, a cloud server) in a network, and the WLAN wireless communication solution provided by the wireless communications module 160 may also enable the electronic device to communicate with the device (for example, the cloud server) in the network. In this way, the electronic device can transmit data to the cloud server.

The electronic device 100 may implement a display function by using the display 194, the application processor, and the like. The display 194 is configured to display a control, information, an image, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, quantum dot light emitting diodes (quantum dot light emitting diodes, QLED), or the like.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of the camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charged coupled device (charged coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more video codecs. Therefore, the electronic device 100 can play or record videos of a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. The NPU can implement applications such as intelligent cognition of the electronic device 100, such as image recognition, facial recognition, speech recognition, and text understanding.

The external memory interface 120 may be used to connect to an external memory card, for example, a micro SD card, to extend a storage capability of the electronic device 100. The external memory card communicates with the processor 110 through the external memory interface 120, to implement a data storage function. For example, data such as music, a photo, and video is stored in the external memory card.

The internal memory 121 may be configured to store one or more computer programs, and the one or more computer programs include instructions. The processor 110 may run the instructions stored in the internal memory 121, so that the electronic device 100 performs the message display method provided in some embodiments of this application, various function applications, data processing, and the like. The internal memory 121 may include a program storage area and a data storage area. The program storage area may store an operating system. The program storage area may further store one or more applications (such as Gallery and Contacts), and the like. The data storage area may store created during use of the electronic device 100. In addition, the internal memory 121 may include a high-speed random access memory, or may include a non-volatile memory, for example, at least one magnetic disk storage device, a flash memory, or a universal flash storage (universal flash storage, UFS).

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When a user makes a call, or sends voice information, the user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be a USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure strength based on a change of the capacitance. When a touch operation is performed on the display 194, the electronic device 100 detects strength of the touch operation by using the pressure sensor 180A. The electronic device 100 may also calculate a touch position based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on an icon of Messages, an instruction for viewing an SMS message is performed. When a touch operation whose touch operation strength is greater than or equal to the first pressure threshold is performed on a Messages icon, an instruction for creating an SMS message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during shooting. For example, when the shutter is pressed, the gyroscope sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyroscope sensor 180B may be used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a flip phone, the electronic device 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be configured to identify a posture of the electronic device, and is used in an application such as switching between a landscape mode and a portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142, to avoid abnormal shutdown due to a low temperature.

The touch sensor 180K may also be referred to as a touch panel or a touch-sensitive surface. The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of the touch event. A visual output related to the touch operation may be provided on the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and functional control of the electronic device 100.

The motor 191 may generate a vibration prompt. The motor 191 may be configured to produce an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may be customized.

The indicator 192 may be an indicator light, and may be configured to indicate a charging status and a power change, or may be configured to indicate a message, a missed call, a notification, and the like.

The SIM card interface 195 is used to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 is also compatible with an external storage card. The electronic device 100 interacts with a network through the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100.

In the example of the electronic device 100 shown in FIG. 2A, the display 194, the touch sensor 180K, the button 190, and the like may be used as an input/output apparatus. The electronic device 100 may display, on the display 194, user interfaces described in the following embodiments, for example, a multi-task management interface and an interface of another application. The electronic device 100 may detect operations of a user in the user interfaces by using the touch sensor 180K, for example, tapping, dragging, sliding up, or sliding down in the user interfaces, so as to receive operation instructions entered by the user. The electronic device 100 may detect, by using the button 190, the operations of the user, for example, touching and holding, or continuously pressing for a plurality of times, and receive the operation instructions entered by the user.

Figure 2B:
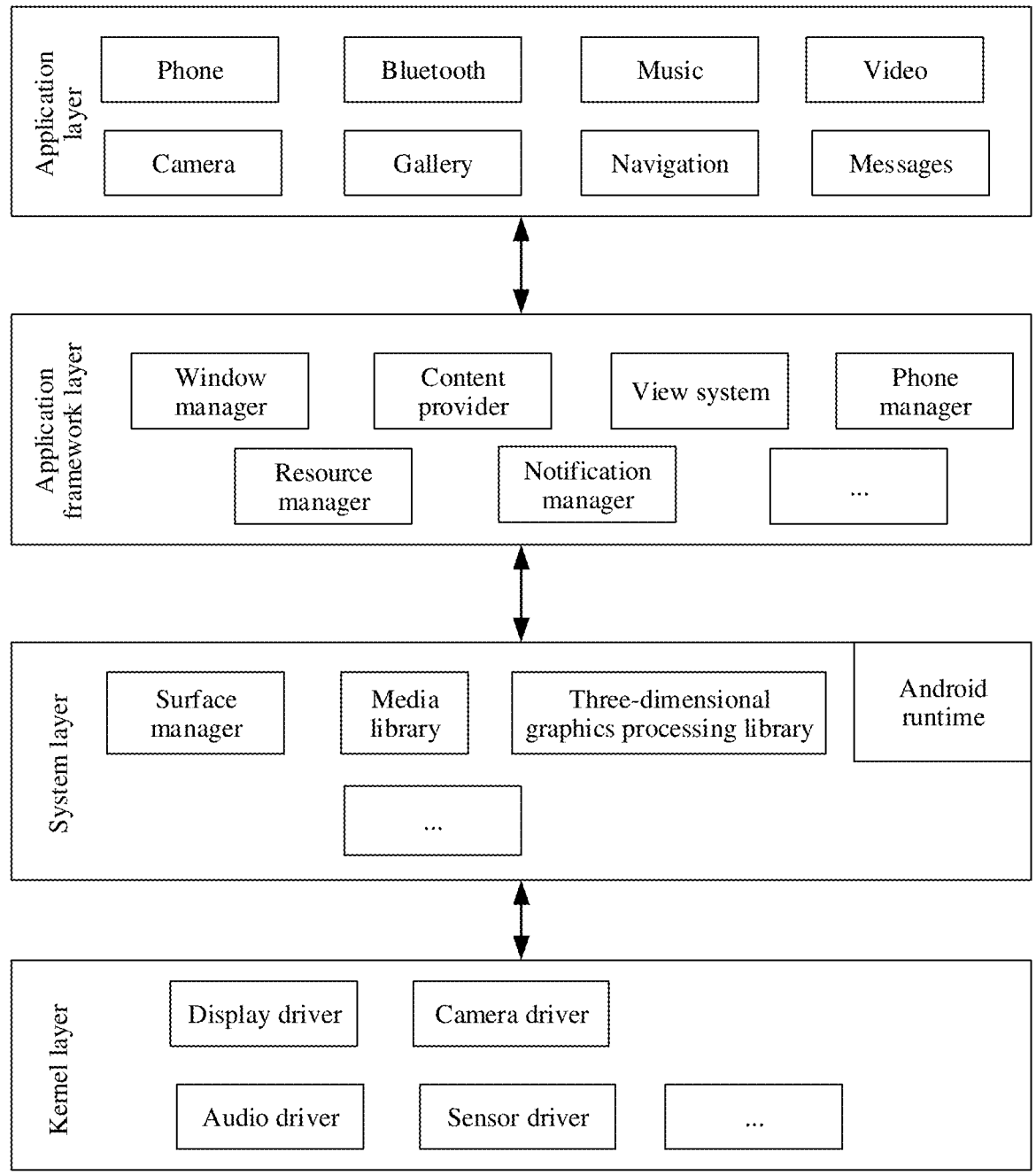
FIG. 2B is a block diagram of an example of a software structure of an electronic device 100 according to this application.

A software system of the electronic device 100 may use a layered architecture, an event-driven architecture, a micro-kernel architecture, a micro service architecture, or a cloud architecture. In this application, an example of a software structure of the electronic device 100 is described by using an example of an Android system with a layered architecture. FIG. 2B is a block diagram of the example of the software structure of the electronic device 100 according to this application.

In the layered architecture, software is divided into several layers, and each layer has a clear role and task. The layers communicate with each other through a software interface. In some embodiments, the Android system is divided into four layers, namely, an application layer, an application framework layer, an Android runtime (Android runtime) and system library, and a kernel layer from top to bottom.

The application layer may include a series of application packages. As shown in FIG. 2B, the application package may include applications such as "Camera", "Gallery", "Phone", "Navigation", "Bluetooth", "Music", "Video", and "Messages".

The application framework layer provides an application programming interface (application programming interface, API) and a programming framework for the application at the application layer. The application framework layer includes some predefined functions. As shown in FIG. 2B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by the application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device 100, for example, management of call statuses (including answering, declining, and the like).

The resource manager provides, for the application, various resources such as a localized character string, an icon, a picture, a layout file, and a video file.

The notification manager enables the application to display notification information in the status bar, and may be configured to transmit a notification-type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: One part is a performance function that needs to be invoked by Java language, and the other part is an Android kernel library.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, a surface manager (surface manager), a media library (media library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, a static image file, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In the foregoing system, at least one electronic device may obtain a historical task record of another electronic device in the system, to perform the interaction method in this application.

In an implementation, the at least one electronic device in the system separately establishes a communication connection to the another electronic device, so as to obtain the historical task record of the another electronic device.

In another implementation, the foregoing system may further include a server. The server may be a cloud server, a common server, or the like. This is not limited in this application. In this implementation, all electronic devices in the system are in communication connection to the server, and synchronize respective historical task records to the server, so that any electronic device in the system can obtain, in the server, a historical task record of another electronic device. In the example shown in FIG. 1, the device 101, the device 102, and the device 103 are separately in communication connection to a cloud server 104, and synchronize respective historical task records to the cloud server 104.

Optionally, when the system further includes the server, the plurality of electronic devices may synchronize respective historical task records to the server through login with a same user account, so that the plurality of electronic devices that is logged in with the same user account can obtain respective historical task records in the server. The user account in embodiments of this application may be a character string for distinguishing identities of different users, for example, an email address or a cloud service account.

To facilitate understanding of the technical solutions of this application, the following briefly describes several concepts in embodiments of this application, including a task, a historical task record, a task record, cross-device task processing, and the like.

Applications running on an electronic device to achieve a specific purpose are also referred to as tasks. For example, if a user opens a browser on an electronic device to browse a web page, the running browser may be considered as a task. For another example, if a user opens a video player on an electronic device to play a video, the running video player may be considered as a task. It should be noted that the task in embodiments of this application may include a task running in a foreground of the electronic device, or may include a task running in a background. These tasks may be viewing tasks, for example, browsing a web page or playing a video file, or may be editing tasks, for example, editing a presentation document or a table. A type of a task is not limited in this application.

The historical task record includes one or more task records, and each task record may record one or more tasks running on an electronic device. A user may view a historical task record of an electronic device in a user interface of the electronic device, to learn of a task running in a foreground or a background of the electronic device.

It should be noted that, if a task is run at different time points, only a latest state of the task, namely, a state at a time point closest to a current time point, is recorded in a corresponding task record. When a task is closed, a task record corresponding to the task is usually no longer retained in a historical task record.

For example, a user first opens a web page A in a browser on an electronic device. In this case, a historical task record includes a task record corresponding to the browser, and the task record records a state of the browser, namely, the web page A. Then, the user opens a video player, and enables the browser to run in a background. In this case, the historical task record includes two task records. One is the task record corresponding to the browser, and records the state of the browser, namely, the web page A. The other is a task record corresponding to the video player, and records a state of the video player. Then, the user closes the video player, and opens a web page B in the browser. In this case, the historical task record includes the task record corresponding to the browser, the state of the browser recorded in the task record has been updated to the web page B, and the task record corresponding to the video player is no longer retained.

It should be further noted that one task record may correspondingly record one or more tasks. When a task runs in a foreground or background, there is a task record corresponding to the task in a historical task record. When a plurality of tasks enter a split-screen mode and run in a foreground or background in a split-screen form, there are task records corresponding to the plurality of tasks in a historical task record. When the plurality of tasks exit the split-screen mode, the historical task record no longer includes the task records corresponding to the plurality of tasks, but includes only the plurality of task records corresponding to the plurality of tasks respectively.

Cross-device task processing mainly indicates continuing processing, on an electronic device (also referred to as a target device below), a task on another electronic device (also referred to as a source device below), that is, continuing running, on the target device, the task that originally runs on the source device. For example, the target device continues running a web page opened on the source device, a played video, or an edited document; or processing data transmitted from the source device.

When one or more electronic devices in the multi-device system can obtain a historical task record of another electronic device, any one of these electronic devices can perform the interaction method for cross-device task processing provided in this application. For ease of description, in this application, an electronic device in the system that performs the interaction method, namely, an electronic device that is currently operated by the user, is referred to as a first electronic device, and another electronic device in the system other than the first electronic device is referred to as a second electronic device.

The first electronic device performs the interaction method in this application, so that the user can view, on the first electronic device, historical task records of the first electronic device and the second electronic device, and can actively select one or more tasks to implement cross-device task processing. This is very convenient, and can provide the user with simple, direct, and easy-to-use interaction experience.

Figure 3:
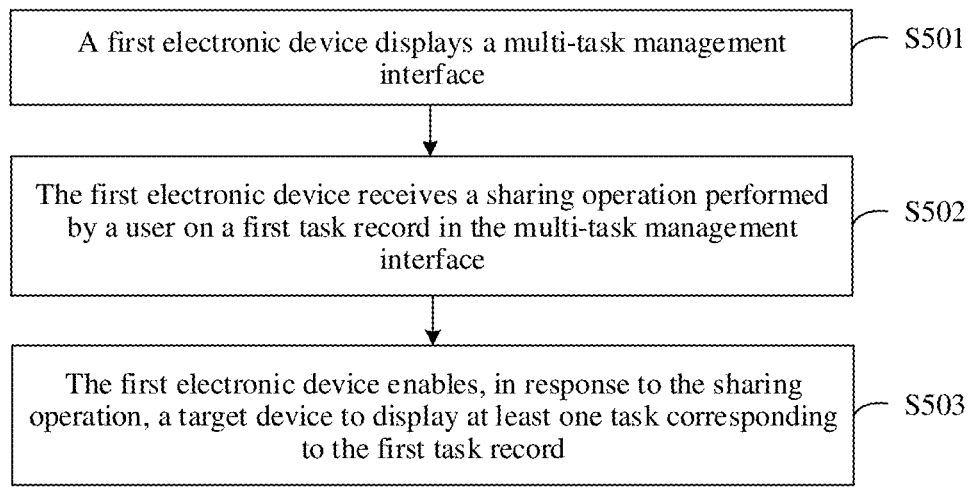
FIG. 3 is a flowchart of an interaction method for cross-device task processing according to this application.

FIG. 3 is a flowchart of an interaction method for cross-device task processing according to this application. The following describes the interaction method in embodiments of this application with reference to FIG. 3. The interaction method is performed by the first electronic device, and may include the following steps S501 to S503.

S501: The first electronic device displays a multi-task management interface.

The multi-task management interface includes N device labels and at least one task record, the N device labels correspond to N electronic devices respectively, and N is a positive integer greater than 1.

Optionally, in an implementation, the first electronic device may receive a first operation performed by the user, and the first electronic device displays the multi-task management interface in response to the first operation. The first operation is mainly used to enable the first electronic device to display the multi-task management interface. The first operation may be any preset operation, may be set by the user, or may be set by a system of the first electronic device. This is not limited in this application.

S502: The first electronic device receives a sharing operation performed by the user on a first task record in the multi-task management interface.

The first task record is any one of task records of a source device, and the source device is any one of the N electronic devices.

For ease of summarizing the interaction method in this application, concepts of the source device and a target device are introduced in embodiments of this application. The source device is an electronic device on which a task that the user expects to process across devices is originally located. The target device is an electronic device that continues running the task on the source device when cross-device task processing is performed.

It should be noted that, when the N electronic devices include the first electronic device and at least one second electronic device, the source device may be either of the first electronic device and the second electronic device, or the target device may be either of the first electronic device and the second electronic device, and the source device and the target device need to be two different electronic devices.

The sharing operation is mainly used to enable the target device to display a task corresponding to the first task record. The sharing operation may be any preset operation, may be set by the user, or may be set by the system of the first electronic device. This is not limited in this application. Because there are different target devices and different display manners of the target devices, the sharing operation may include a plurality of different implementations, for example, a subsequent second operation, third operation, fourth operation, fifth operation, sixth operation, and seventh operation. The operations are further described in subsequent embodiments.

S503: The first electronic device enables, in response to the sharing operation, the target device to display at least one task corresponding to the first task record.

As described above, the target device is any one of the N electronic devices, and the target device is different from the source device.

In different cases of whether the target device is the first electronic device, the first electronic device may implement different functions by performing the interaction method in this application, and the functions include: sharing a task on a second electronic device with the first electronic device; and sharing a task on the first electronic device with the second electronic device, or sharing the task on the second electronic device with another second electronic device. The following separately describes the interaction method in this application based on the two functions.

The interaction method for cross-device task processing in this application is described in the following embodiments by using an example in which the device 101 is used as the device currently operated by the user, namely, the first electronic device, and the device 102 and the device 103 are used as the second electronic devices. An input/output apparatus of the device 101 is a touchscreen. The touchscreen may display different user interfaces, and may also receive a user operation.

Embodiment 1

In this embodiment, the target device is the first electronic device, and the source device is any one of the second electronic devices.

First, the first electronic device receives the first operation performed by the user, and the first electronic device displays the multi-task management interface in response to the first operation.

The user performs the first operation in any user interface displayed on the display of the device 101. For example, the first operation may be sliding upward from a bottom of the user interface, sliding downward from a top of the user interface, or the like. A specific form of the first operation is not limited in this embodiment of this application. The device 101 displays the multi-task management interface in response to the first operation.

Figure 4A:
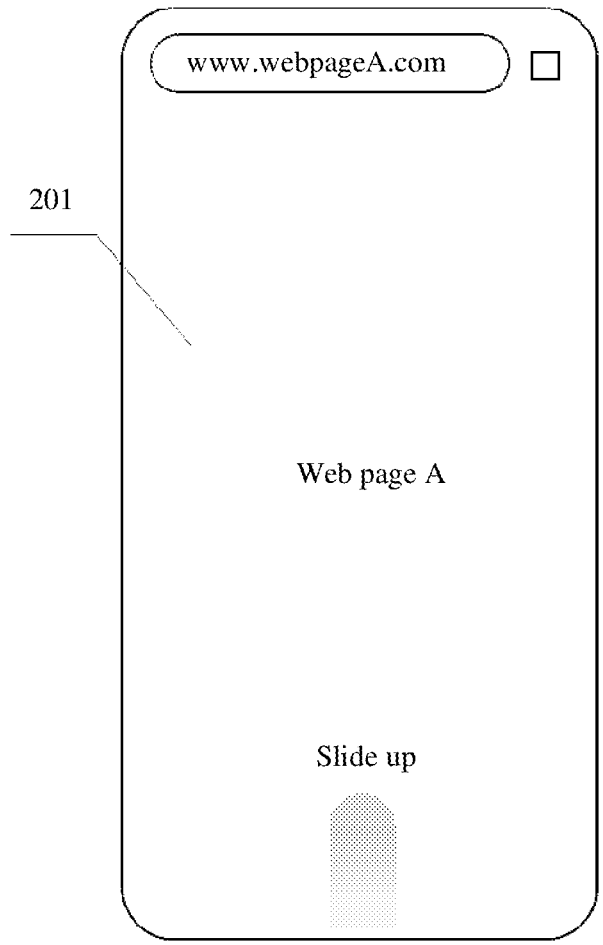
FIG. 4A is a schematic diagram of a first example of a user interface displayed on a device 101 before a first operation is performed.

For example, refer to FIG. 4A. FIG. 4A is a schematic diagram of a first example of the user interface displayed on the device 101 before the first operation is performed. It can be seen from FIG. 4A that, the user interface 201 displays a web page "Web page A" in a browser on the device 101, and then the user performs an upward sliding operation from a bottom of the user interface 201. After receiving the operation instruction 1, the device 101 displays the multi-task management interface 290.

The multi-task management interface displays N device labels corresponding to N electronic devices respectively, where N is a positive integer greater than 1.

For ease of distinguishing, in this embodiment, a device label corresponding to the first electronic device (namely, the device 101) is referred to as a first label, and device labels corresponding to the second electronic devices (namely, the device 102, the device 103, and the like) are referred to as second labels. As described in step S501, the N electronic devices may not include the first electronic device, but include only a plurality of second electronic devices, or may include the first electronic device and at least one second electronic device. When the N electronic devices include only the plurality of second electronic devices, all device labels displayed in the multi-task management interface are the second labels. When the N electronic devices include the first electronic device and the at least one second electronic device, device labels displayed in the multi-task management interface include the first label and the second labels. An objective of this embodiment is to share one or more tasks in a historical task record of the second electronic device with the first electronic device. Therefore, in this embodiment, regardless of whether the first label is displayed in the multi-task management interface, implementation of the objective is not affected.

Figure 4B:
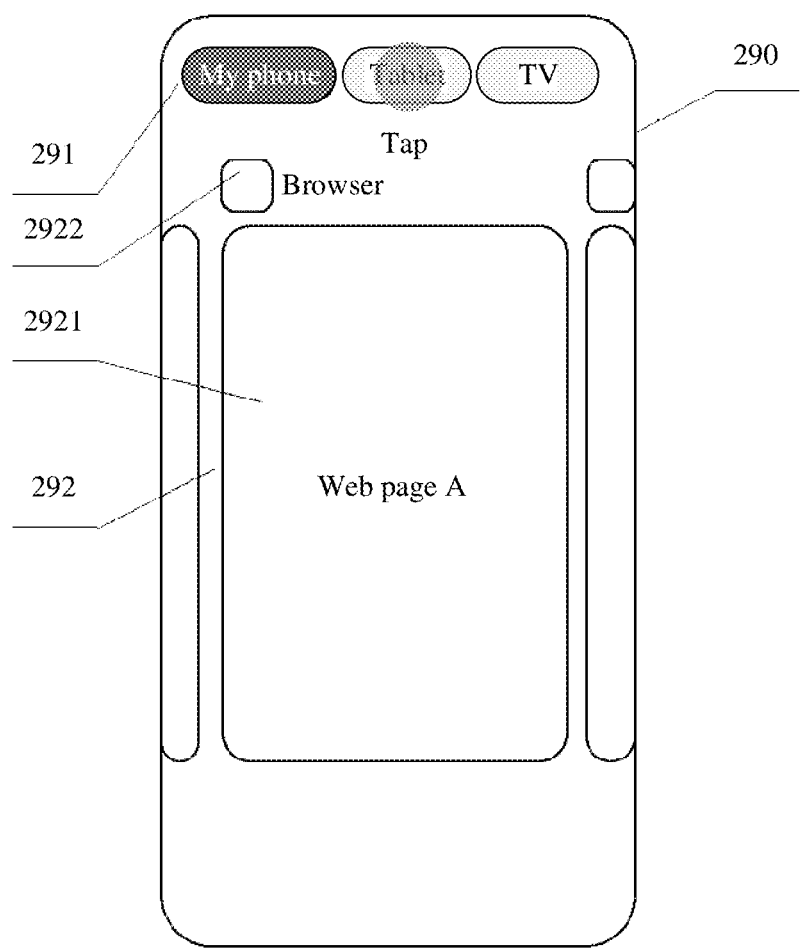
FIG. 4B is a schematic diagram of a first example of a multi-task management interface of a device 101 according to an embodiment of this application.

FIG. 4B is a schematic diagram of a first example of the multi-task management interface of the device 101 according to this embodiment of this application. In the example shown in FIG. 4B, the multi-task management interface 290 displays a first label "My phone" corresponding to the device 101, a second label "Tablet" corresponding to the device 102, and a second label "TV" corresponding to the device 103.

The device label in embodiments of this application may be in a form of a capsule-shaped icon plus text, for example, a form shown in FIG. 4B, or may be in another form. This is not limited in this application.

The user may perform a selection operation on the device label in the multi-task management interface to change the selected device label. It should be noted that, in the multi-task management interface, a state, namely, a selected or unselected state, of a device label may be distinguished in different representation forms. In this way, the user can directly view the state of the device label. A specific representation form is not limited in this application.

In the example in FIG. 4B, a background color of the first label "My phone" corresponding to the device 101 is deeper than a background color of the second label "Tablet" corresponding to the device 102 and a background color of the second label "TV" corresponding to the device 103. This indicates that the first label "My phone" is selected, while the second label "Tablet" and the second label "TV" are not selected.

The multi-task management interface further displays at least one task record in a historical task record of the electronic device corresponding to the selected device label.

In the example in FIG. 4B, because a device corresponding to the currently selected first label "My phone" in the multi-task management interface is the device 101, the multi-task management interface further displays the historical task record of the device 101, including the web page "Web page A" opened in the browser on the device 101.

When the user performs an operation in the multi-task management interface to change the selected device label, the historical task record displayed in the multi-task management interface also changes accordingly.

Figure 4C:
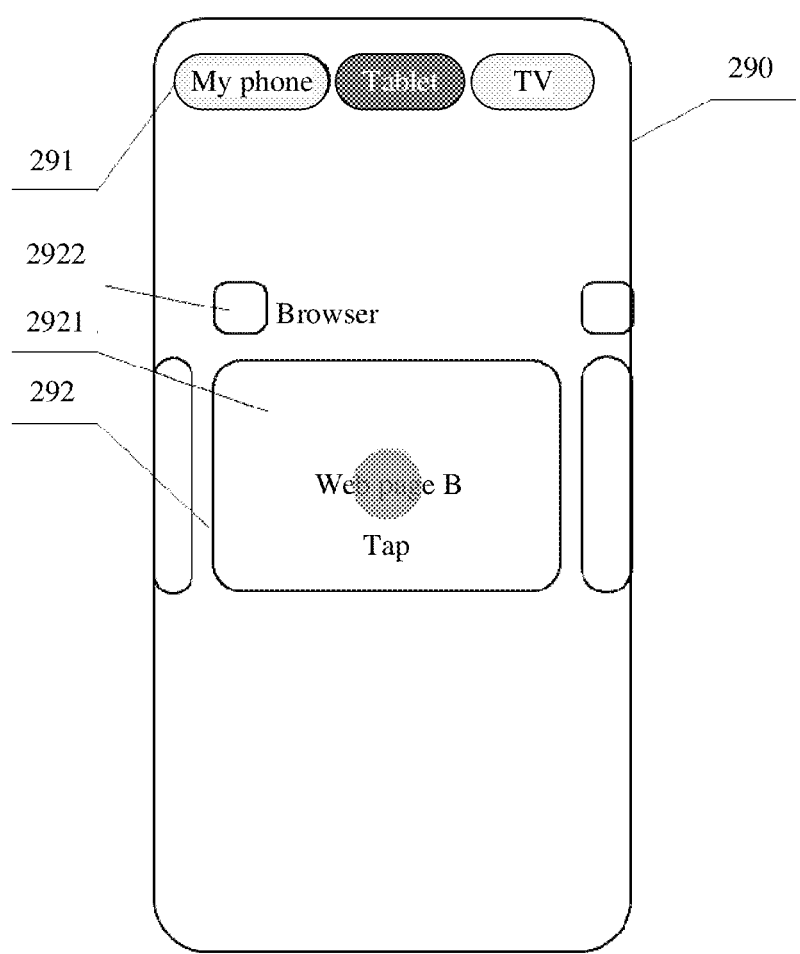
FIG. 4C is a schematic diagram of a second example of a multi-task management interface of a device 101 according to an embodiment of this application.

For example, refer to FIG. 4C. FIG. 4C is a schematic diagram of a second example of the multi-task management interface of the device 101 according to this embodiment of this application. The user taps the second label "Tablet" corresponding to the selected device 102 in the multi-task management interface, and the multi-task management interface correspondingly displays a historical task record of the device 102, for example, a web page "Web page B" opened in a browser on the device 102.

Each task record in the historical task record may be presented in a task card, or may be presented in another form. A presentation form of the historical task record is not limited in this application. For ease of description, descriptions are provided by using an example in which a task record is represented in the task card in this embodiment and subsequent embodiments, for example, a task card 2921 "Web page A" in FIG. 4B and a task card 2921 "Web page B" in FIG. 4C.

Optionally, the electronic device may save, in a thumbnail form in a task record corresponding to the task, a user interface when a task is returned from a foreground to a background. Therefore, when displaying is required, the first electronic device may display the thumbnail in a corresponding task card to the user, so that the user views the thumbnail.

Because the historical task record of the electronic device corresponding to the selected device label may include many task records, and the display cannot display all the task records at a time, the user may perform a specific operation to view another task record in the historical task record.

In the examples in FIG. 4B and FIG. 4C, the user may slide left or right to view another task card.

Optionally, in the multi-task management interface, an application label corresponding to a task record may be displayed near the task record, to indicate an application corresponding to the task record.

In the example in FIG. 4B, a corresponding application label 2922 is further displayed above the task card 2921 "Web page A", to indicate that an application corresponding to the task card is the "browser".

The device label and the historical task record may be displayed in a same area or in different areas in the multi-task management interface.

Optionally, the multi-task management interface may include two areas, namely, a first area and a second area. The first area is used to display the device label, and the second area is used to display the historical task record of the device corresponding to the selected device label.

In the example in FIG. 4B, the multi-task management interface 290 includes a first area 291 and a second area 292. The first area 291 displays three device labels, and the second area 292 displays the historical task record of the device 101, including the web page "Web page A" opened in the browser.

It should be noted that, in the multi-task management interface in embodiments of this application, the first area may be above the second area, as shown in the examples in FIG. 4B and FIG. 4C, or may be below the second area or at another position. A relative position between the first area and the second area and forms of the first area and the second area in the multi-task management interface are not limited in this application. In addition, the multi-task management interface may further include another area in addition to the first area and the second area if necessary. This is not limited in this application either.

Optionally, when the user enters the first operation on the device 101 to enter the multi-task management interface, the device label corresponding to the device 101 may be selected by default in the multi-task management interface, or a device label previously selected when the user exits the multi-task management interface may be selected by default. This is not limited in this application. An implementation of default selection may be configured by the system of the device 101, or may be set by the user. This is not limited in this application either.

For example, in the device 101, if the first label "My phone" corresponding to the device 101 is selected by default, each time the user enters the multi-task management interface 290 of the device 101, the selected device label in the first area 291 is "My phone", and the second area 292 displays the historical task record of the device 101, as shown in FIG. 4B. In this way, when implementing cross-device task processing, the user needs to first select device labels of one or more other devices such as the device 102 or the device 103, and then performs subsequent operations.

For another example, on the device 101, if the device label previously selected when the user exits the multi-task management interface 290 is selected by default, when the multi-task management interface 290 is currently entered, the selected device label in the first area 291 should be the same as the device label previously selected when the user exits the multi-task management interface 290. For example, the user previously selects the second label "Tablet" corresponding to the device 102 when entering the multi-task management interface 290 of the device 101, and then exits the multi-task management interface 290. Then, next time when the user performs the first operation on the device 101 to enter the multi-task management interface 290, the displayed selected device label is the second label "Tablet", and the displayed historical task record is the historical task record of the device 102 corresponding to the "Tablet", as shown in FIG. 4C. In this way, if the user still wants to process the task on the device 102 across devices next time, the user does not need to tap and select the second label "Tablet" for changing the selected device label from the first label "My phone" to the second label "Tablet".

Then, the first electronic device receives the sharing operation performed by the user on the first task record. The first electronic device enables, in response to the sharing operation, the target device to display the at least one task corresponding to the first task record.

The first task record in this embodiment of this application is a task record corresponding to the task that the user expects to process across devices, and may be any task record in the historical task record of the source device. In this embodiment, the source device is the any one of the second electronic devices. Therefore, the first task record may be any task record in a historical task record of the any second electronic device.

After determining the task record corresponding to the task expected to be processed across devices, namely, the first task record, the user may perform the sharing operation on the task record, so that the first electronic device displays the at least one task corresponding to the first task record.

There may be a plurality of different display manners in which the first electronic device displays the at least one task corresponding to the first task record. Correspondingly, the user may perform different sharing operations, so that the first electronic device may identify, based on the different sharing operations, a specific display manner expected by the user.

In an implementation, the user may perform a second operation on the first task record. The first electronic device displays, in response to the second operation, the at least one task corresponding to the first task record.

The second operation may be any preset operation, for example, tapping. A specific form of the second operation is not limited in this embodiment of this application. The second operation may be one operation, or may be an operation combination including a plurality of operations. This is not limited in this application either.

Figure 4D:
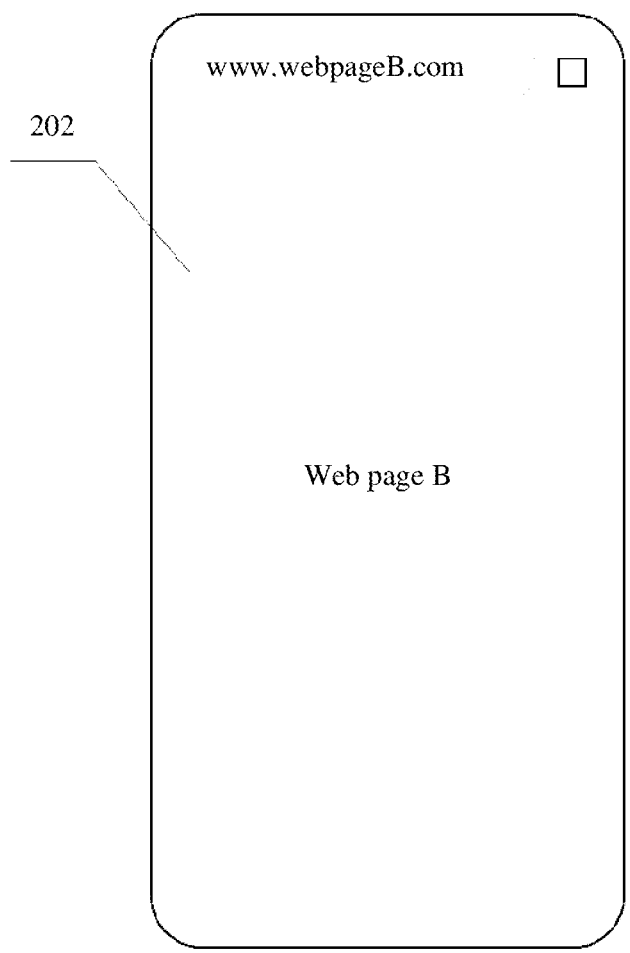
FIG. 4D is a schematic diagram of a first example of a user interface displayed on a device 101 after a second operation is performed according to an embodiment of this application.

In the example in FIG. 4C, the user expects to share, with the device 101, a task corresponding to the task card 2921 "Web page B" on the device 102, and browse the task on the device 101. Then, the user may tap the task card 2921 "Web page B" in the second area 292 in FIG. 2C. FIG. 4D is a schematic diagram of a first example of a user interface displayed on the device 101 after the second operation is performed according to this embodiment of this application. In the examples in FIG. 4C and FIG. 4D, the device 101 displays, in response to the second operation, the user interface 202 on the display of the device 101, namely, the web page "Web page B" on the device 102. In this way, the user can continue browsing, on the device 101, the web page on the device 102, thereby implementing cross-device processing of a single task.

It should be noted that, when the first task record corresponds to a single task record, the first electronic device displays, in response to the second operation, the single task corresponding to the first task record, as shown in FIG. 4D; or when the first task record corresponds to a plurality of related tasks, the first electronic device displays, in response to the second operation, the plurality of related tasks corresponding to the first task record in a split-screen form. In this application, a plurality of tasks running on the source device in a split-screen form are referred to as related tasks. A task record may correspond to one or more related tasks.

Figure 4E:
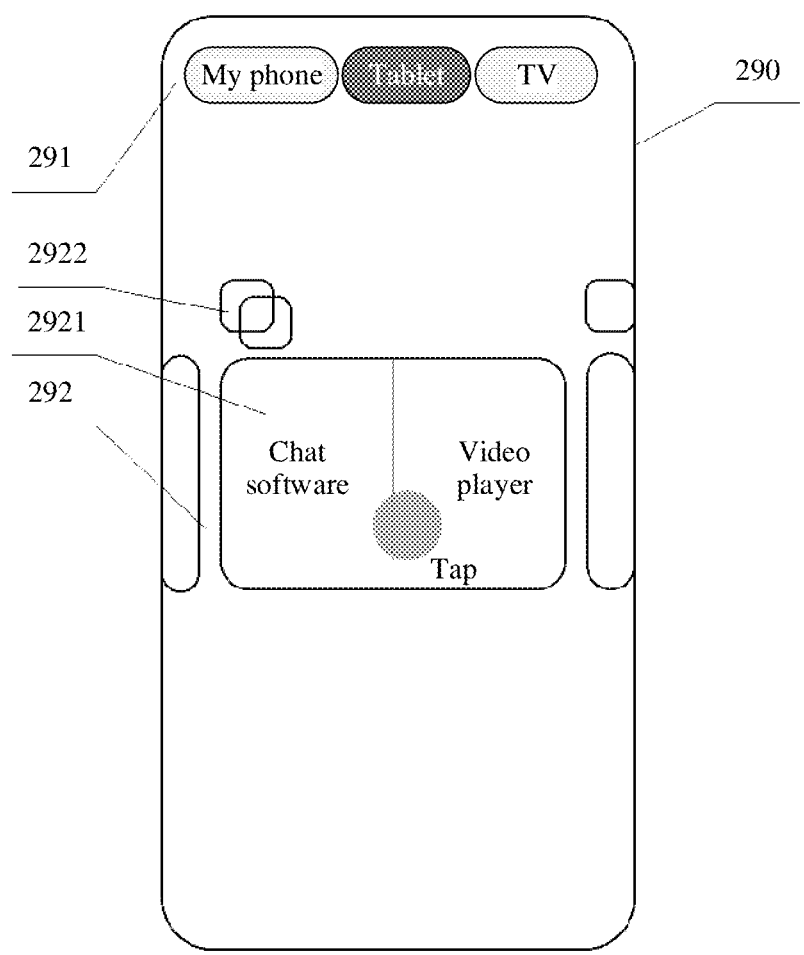
FIG. 4E is a schematic diagram of a third example of a multi-task management interface of a device 101 according to an embodiment of this application.
Figure 4F:
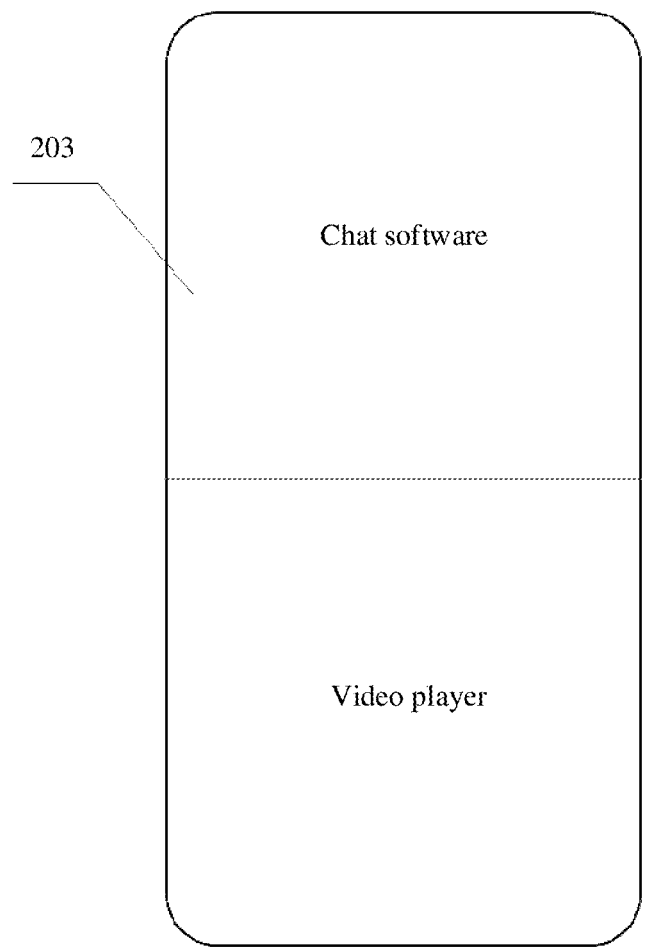
FIG. 4F is a schematic diagram of a second example of a user interface displayed on a device 101 after a second operation is performed according to an embodiment of this application.

FIG. 4E is a schematic diagram of a third example of the multi-task management interface of the device 101 according to this embodiment of this application; and FIG. 4F is a schematic diagram of a second example of the user interface displayed on the device 101 after the second operation is performed according to this embodiment of this application. In FIG. 4E, one task card 2921 is displayed in the second area 292. The task card 2921 indicates that one task record in the historical task record of the device 102 includes two related tasks "Chat software" and "Video player" displayed in a split-screen form. The user performs the second operation on the task card 2921, that is, taps the task card 2921. The device 101 displays, in response to the second operation, the user interface 203 on the display of the device 101, and displays the tasks "Chat software" and "Video player" on the device 102 in a split-screen form, as shown in FIG. 4F. In this way, the user can continue viewing the chat software and watch a video on the device 101 in the split-screen form, thereby implementing cross-device processing of the plurality of tasks.

It should be further noted that although the plurality of related tasks are displayed in a split-screen form on both devices, a split-screen display manner of the plurality of related tasks on the first electronic device may be the same as or different from a split-screen display manner of the plurality of related tasks on the second electronic device. This is not limited in this application. In the examples shown in FIG. 4E and FIG. 4F, the related tasks "Chat software" and "Video player" are displayed on the device 102 in a left-right split-screen manner, and are displayed on the device 101 in an up-down split-screen manner.

In another display manner, the user may perform a sixth operation on the first task record and a device label corresponding to the any second electronic device. The first electronic device displays, in response to the sixth operation, in a split-screen form, a task running in a foreground of the first electronic device and the at least one task corresponding to the first task record.

The sixth operation may be any preset operation. A specific form of the sixth operation is not limited in this embodiment of this application. The sixth operation may be one operation, or may be an operation combination including a plurality of operations, for example, touching and holding+dragging. This is not limited in this application either. Generally, to avoid confusion, the sixth operation and the second operation should be set to different operations.

Figure 4G:
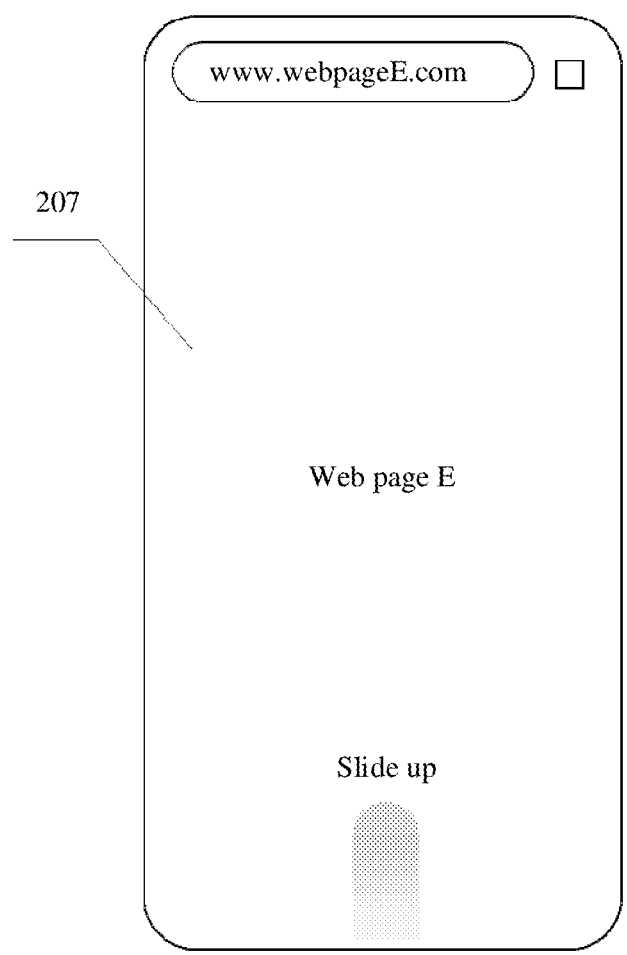
FIG. 4G is a schematic diagram of a second example of a user interface displayed on a device 101 before a first operation is performed.
Figure 4H:
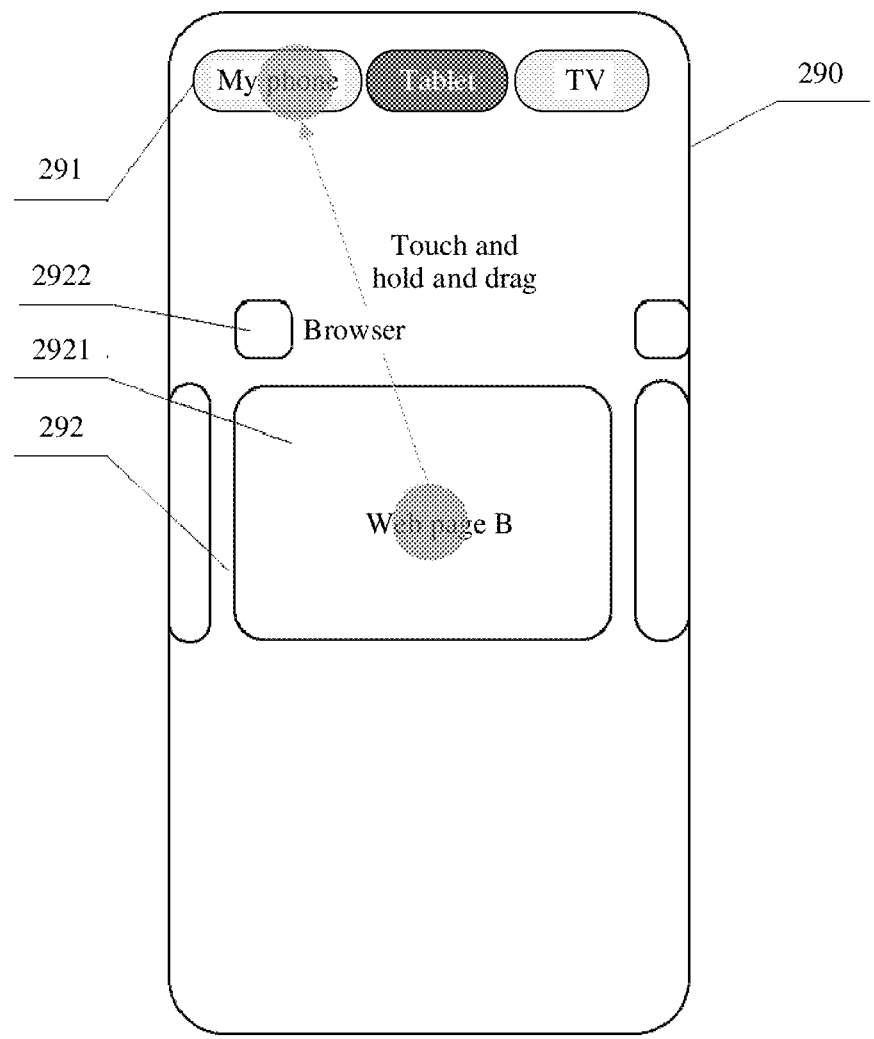
FIG. 4H is a schematic diagram of a fourth example of a multi-task management interface of a device 101 according to an embodiment of this application.
Figure 4I:
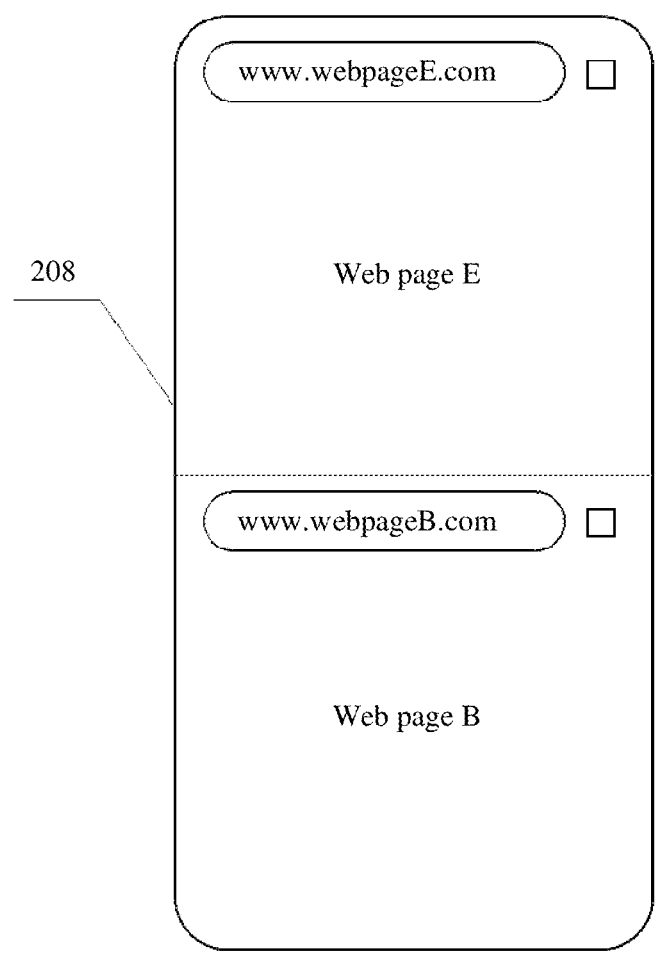
FIG. 4I is a schematic diagram of a third example of a user interface displayed on a device 101 after a sixth operation is performed according to an embodiment of this application.

For example, FIG. 4G is a schematic diagram of a second example of the user interface displayed on the device 101 before the first operation is performed; FIG. 4H is a schematic diagram of a fourth example of the multi-task management interface of the device 101 according to this embodiment of this application; and FIG. 4I is a schematic diagram of a third example of the user interface displayed on the device 101 after the sixth operation is performed according to this embodiment of this application.

It can be seen from FIG. 4G that the user interface 207 displays a task running in the foreground of the device 101, namely, a web page "Web page E" opened in the browser. The user performs the first operation in the user interface 207, for example, slides up from a bottom of the user interface 207. The device 101 displays the multi-task management interface 290 in response to the first operation. The user taps and selects the second icon "Tablet" in the first area 291, and the historical task record of the device 102 corresponding to the "Tablet" is displayed in the second area 292, as shown in 4H. In the second area 292, the user may slide left or right to view another task card 2921, so as to select the task that the user wants to continue processing on the target device.

It is assumed that the user wants to share the task "Web page B" on the device 102 with the device 101, and display, in a split-screen manner, the task and the web page "Web page E" that is currently being browsed on the device 101. In this case, the user performs the sixth operation in the multi-task management interface 290 of the device 101, for example, touches and holds the task card "Web page B", and then drags the "Web page B" to the device label "My phone" corresponding to the device 101 in the first area 291. In response to the sixth operation, the device 101 shares the task corresponding to the web page "Web page B" on the device 102 with the device 101, and displays the web page "Web page B" and the "Web page E" on the device 101 in the split-screen form, as shown in the user interface 208 in FIG. 4I. In this way, the user can continue browsing, on the device 101, the web page "Web page B" on the device 102, thereby implementing task cross-device processing; and can further browse the web page "Web page E" that is currently browsed on the device 101.

The sixth operation is performed in the multi-task management interface of the first electronic device, so that the at least one task corresponding to the any task record of the any second electronic device and the task currently running in the foreground of the first electronic device can be displayed in a split-screen manner.

In still another display manner, the user may perform a fourth operation on a file in the first task record. The first electronic device receives the file in the first task record in response to the fourth operation. In addition, if an application that can open the file is installed in the first electronic device, the first electronic device displays the file.

The fourth operation may be any preset operation, for example, dragging. A specific form of the fourth operation is not limited in this embodiment of this application. The fourth operation may be one operation, or may be an operation combination including a plurality of operations, for example, touching and holding+dragging. This is not limited in this application either. The fourth operation and the sixth operation may be set to different operations, or may be set to same operations. This is not limited in this application either.

It should be understood that, in this application, although the historical task records of the second electronic device can be viewed in the multi-task management interface of the first electronic device, to enable the target device (the first electronic device in this embodiment) to run tasks corresponding to task records in the historical task records, the target device further needs to obtain, from the source device (the second electronic device in this embodiment), data required for running these tasks.

Because a data volume of the data required for running these tasks is usually far greater than a data volume required for displaying the task records corresponding to these tasks, the target device can obtain, after the user performs the sharing operation, the data required for running these tasks. The target device can obtain, in a plurality of manners, the data for the task processed across devices. This is not limited in this application.

In an implementation, when both the target device and the source device are in communication connection to a server, the source device may send the data for the task that needs to be processed across devices to the server, and then the target device obtains the data from the server.

For example, in the multi-device system shown in FIG. 1, the device 101, the device 102, and the device 103 are separately in communication connection to the cloud server 104. Indirect communication connections between the device 101, the device 102, and the device 103 are implemented by using the cloud server 104. After receiving the second operation, the device 101 may send a request to the cloud server 104 to request the cloud server 104 to send, to the device 101, the data for the task that needs to be processed across devices, for example, data for the web page "Web page B" on the device 102. After receiving these pieces of data, the device 101 may display the task that needs to be processed across devices, as shown in the user interface 202 in FIG. 4D.

In another implementation, when the target device and the source device are connected in a near field communications manner, the source device may directly send the data for the task that needs to be processed across devices to the target device.

For example, the device 101 and the device 102 implement a direct communication connection in a near field communications manner, for example, Bluetooth, a Wi-Fi controller (Wi-Fi Director), or projection based on a MirrorCast protocol after the direct connection. After receiving the second operation, the device 101 may directly send a request to the device 102 to request the device 102 to send, to the device 101, the data for the task that needs to be processed across devices, for example, data for the web page "Web page B" in the device 102. After receiving these pieces of data, the device 101 may display the task that needs to be processed across devices, as shown in the user interface 202 in FIG. 4D.

Optionally, in an implementation of the interaction method in this embodiment, the method includes the following steps:

The first electronic device displays the multi-task management interface, where the multi-task management interface includes a first label corresponding to the first electronic device, a second label corresponding to the second electronic device, and at least one task record of the second electronic device.

The first electronic device receives a tap operation performed by the user on a first task record of the second electronic device in the at least one task record, where the first task record corresponds to a first task running on the second electronic device.

The first electronic device obtains, in response to the tap operation on the first task record, data required for running the first task.

The first electronic device executes the first task.

In this implementation, the user performs the tap operation on the first task record in the multi-task management interface of the first electronic device, so that the first electronic device can display a first task originally running on a second electronic device, thereby conveniently implementing cross-device processing of the first task.

Optionally, in another implementation of the interaction method in this embodiment, the method includes the following steps:

The first electronic device displays the multi-task management interface, where the multi-task management interface includes a first label corresponding to the first electronic device, a second label corresponding to the second electronic device, and at least one task record of the first electronic device.

The first electronic device receives an operation of dragging, by the user, a first task record of the first electronic device in the at least one task record to the second label, where the first task record corresponds to a first task running on the first electronic device.

The first electronic device enables, in response to the operation of dragging the first task record to the second label, the second electronic device to display the first task.

In this implementation, the user drags, in the multi-task management interface of the first electronic device, the first task record to the second label, so that the second electronic device corresponding to the second label can display the first task originally running on the first electronic device, thereby conveniently implementing cross-device processing of the first task.

It should be noted that the first task in this application is one or more tasks corresponding to the first task record. As described above, the first task record is a task record corresponding to a task that the user expects to process across devices, and may be any record in a historical task record of the source device. Based on this, the first task may be any one or more tasks on the source device.

After entering the multi-task management interface of the first electronic device, the user may select one or more device labels. When the user selects a plurality of device labels, historical task records of the plurality of electronic devices are displayed in the multi-task management interface, so that the historical task records of the plurality of devices can be viewed globally. The plurality of historical task records may be displayed in a plurality of manners. The following separately describes two possible implementations.

In an implementation of displaying the historical task records of the plurality of electronic devices, the multi-task management interface may display the historical task records of the plurality of electronic devices based on different applications. When one or more same applications are installed on the plurality of selected electronic devices, task records in the historical task records of the plurality of electronic devices may be displayed by category based on the applications, that is, the task records in the historical task records of the plurality of electronic devices are aggregated in an application dimension.

Optionally, an application label corresponding to an application may be displayed in the multi-task management interface, so as to indicate the application used for classification.

Optionally, a label of a device to which a task corresponding to a task record belongs may be displayed in the multi-task management interface, so as to indicate the task record is a historical task record of the electronic device.

In this manner, the user can view the task records of the plurality of electronic devices in the application dimension, and when viewing tasks that are on a plurality of different devices and that are opened by using the same applications, the user can further conveniently compare progresses of the tasks on the different devices, thereby improving efficiency of viewing and determining, by the user, the task that needs to be processed across devices.

Figure 4J:
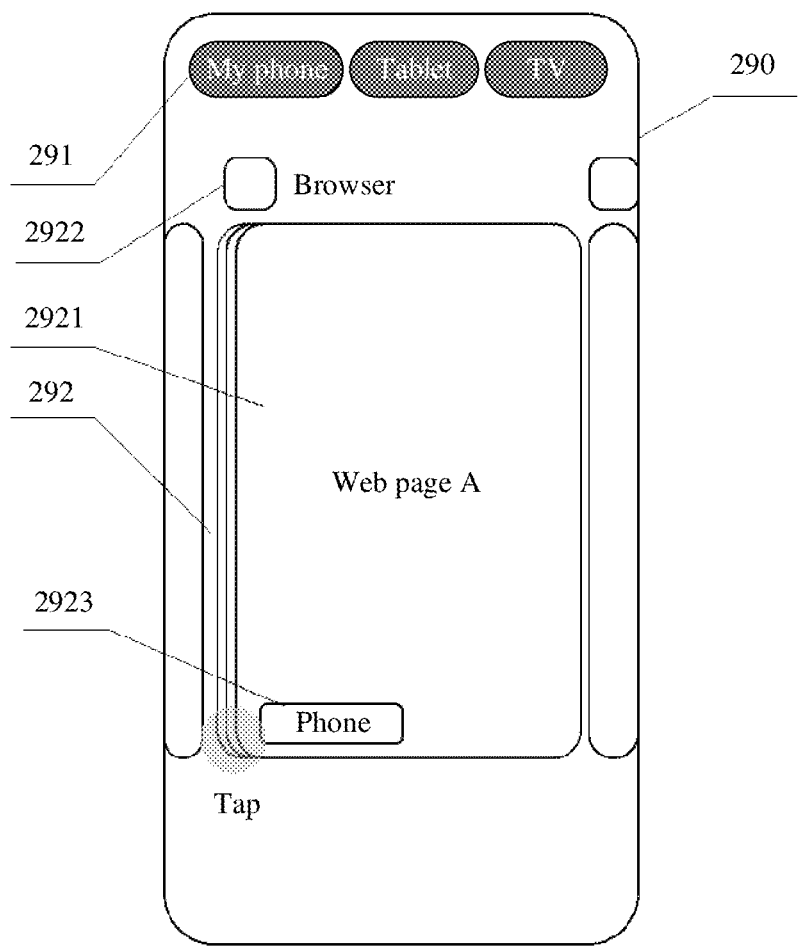
FIG. 4J is a schematic diagram of a fifth example of a multi-task management interface of a device 101 according to an embodiment of this application.
Figure 4K:
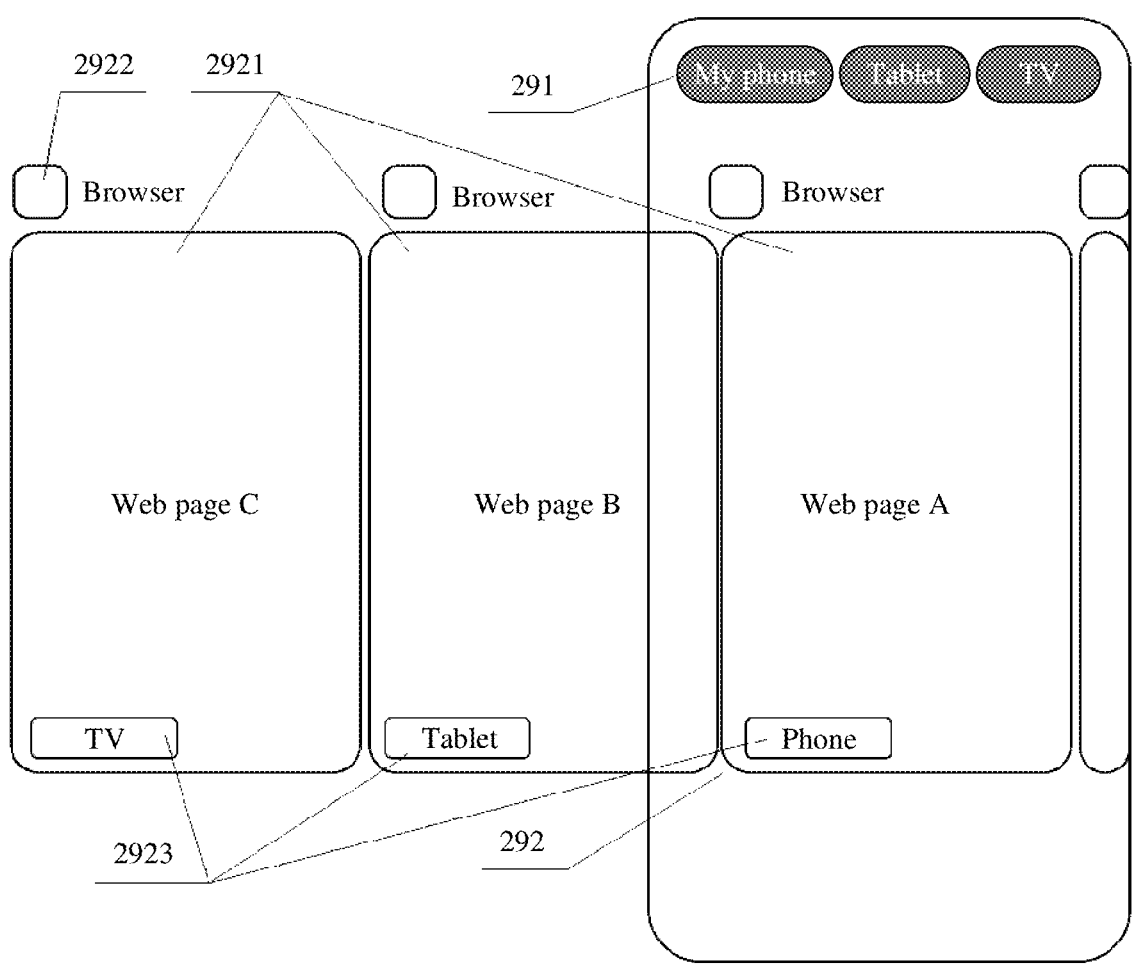
FIG. 4K is an expanded schematic diagram of the multi-task management interface in FIG. 4J.
Figure 4L:
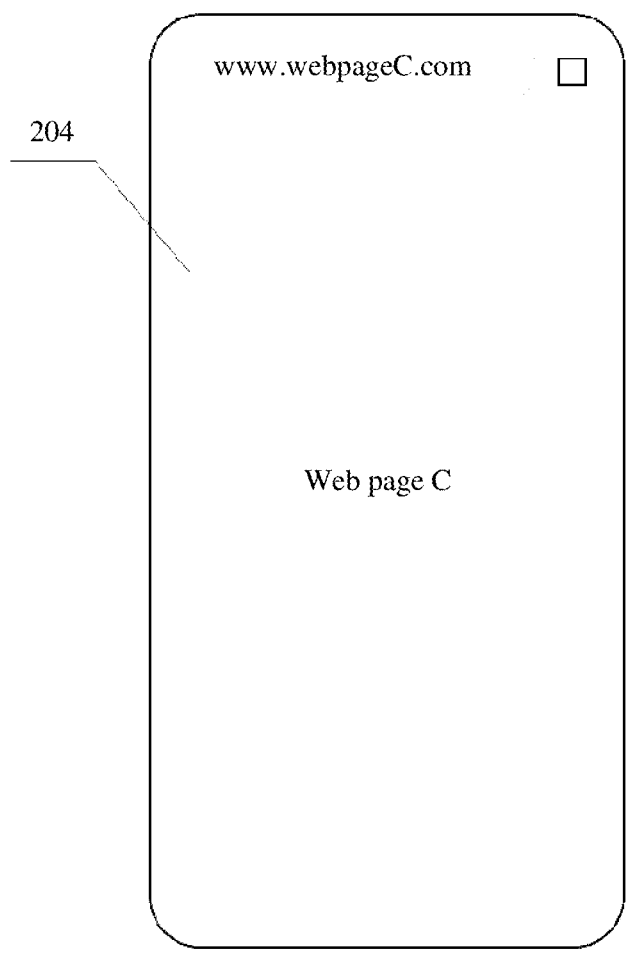
FIG. 4L is a schematic diagram of a fourth example of a user interface displayed on a device 101 after a second operation is performed according to an embodiment of this application.

For example, refer to FIG. 4J to FIG. 4L. FIG. 4J is a schematic diagram of a fifth example of the multi-task management interface of the device 101 according to this embodiment of this application; FIG. 4K is an expanded schematic diagram of the multi-task management interface in FIG. 4J; and FIG. 4L is a schematic diagram of a fourth example of the user interface displayed on the device 101 after the second operation is performed according to this embodiment of this application. In the multi-task management interface 290 in FIG. 4J, the device label "My phone" corresponding to the device 101, the device label "Tablet" corresponding to the device 102, and the device label "TV" corresponding to the device 102 are all selected. A same browser is installed on each of the device 101, the device 102, and the device 103. It is assumed that historical task records of the device 101, the device 102, and the device 103 each record a task in the browser. In this case, in the multi-task management interface, task cards 2921 of tasks in the browsers of the three different electronic devices may be stacked together and presented to the user. A corresponding application label 2922 may be displayed above the task cards 2921 stacked together. The user taps the stacked task cards 2921, and these task cards 2921 are expanded. Each task card 2921 corresponds to the task on the electronic device, as shown in FIG. 4K. On the task card 2921, a label 2923 of a device to which a task belongs may be used to indicate the task record is from a historical task record of the electronic device, as shown in FIG. 4J and FIG. 4K.

After determining the task that the user wants to process across devices, the user can tap the task card corresponding to the task. For example, the user taps the task card 2921 "Web page C" in FIG. 3B. After receiving the tap operation, the device 101 displays the user interface 204 on the display of the device 101, as shown in FIG. 4L. In this way, the user can continue browsing, on the device 101, the web page "Web page C" on the device 103, thereby implementing cross-device task processing.

It should be noted that the task originally running on the device 101, for example, the web page "Web page A" in FIG. 4K, may run in the background of the device 101. If the user taps the task card corresponding to the task, for example, the task card "Web page A" in FIG. 4K, the task corresponding to the task card is displayed on the display of the device 101, that is, the task running in the background of the device 101 is switched to the foreground.

In another implementation of displaying the historical task records of the plurality of electronic devices, the multi-task management interface may display task records in the historical task records of the plurality of electronic devices in a time sequence of tasks.

Time used for the sorting herein may be set according to different requirements. This is not limited in this application. For example, in an implementation, a time point at which a task is switched from a foreground to a background may be determined as time used for sorting the task; and a current time point during sorting may be used as time used for sorting a task running in the foreground. For another example, in another implementation, time at which the user performs an operation on a task for the last time may be determined as time used for sorting the task.

Optionally, in addition to the foregoing application label and the label of the device to which the task belongs, the multi-task management interface may further display a time label used to indicate time information such as a time point or a time interval at which a corresponding task runs on an original electronic device. The time information indicated by using the time label may be the same as or different from the time used for sorting. For example, the time used for sorting may be a time point accurate to second, and the time information indicated by using the time label may be a time interval accurate to day.

In this manner, the user can view the task records of the plurality of electronic devices in the time sequence, to conveniently determine the task that needs to be processed across devices.

Figure 4M:
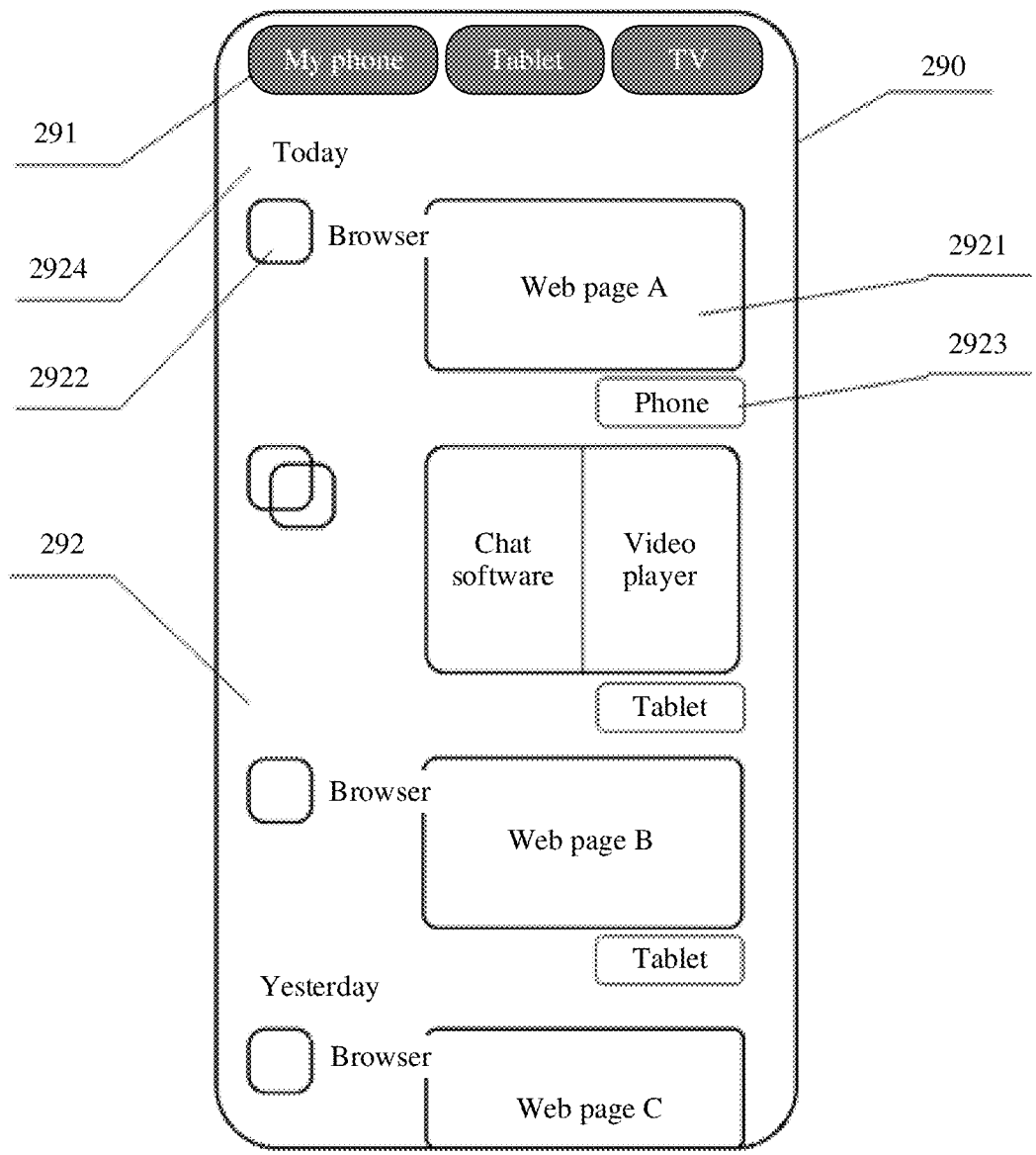
FIG. 4M is a schematic diagram of a sixth example of a multi-task management interface of a device 101 according to an embodiment of this application.

For example, FIG. 4M is a schematic diagram of a sixth example of the multi-task management interface of the device 101 according to this embodiment of this application. In the first area 291 in the multi-task management interface 290, the device label "My phone" corresponding to the device 101, the device label "Tablet" corresponding to the device 102, and the device label "TV" corresponding to the device 102 are all selected. In the second area 292, all task cards in the historical task records of the device 101, the device 102, and the device 103 are arranged and displayed in descending order of time. A corresponding application label 2922 and a corresponding label 2923 of a device to which a task belongs may be displayed on one side of each task card 2921. In addition, a time label 2924 may be displayed in the second area 292, for example, "Today" and "Yesterday" in FIG. 4M. The user may slide up or down in the second area 292 to select the task that needs to be processed across devices. After determining the task that needs to be processed across devices, the user may tap the task card of the task, to be specific, perform the second operation on the task card. For example, the user taps the task card 2921

"Web page B" in FIG. 4M. The device 101 displays, in response to the second operation, the user interface of the task on the display of the device 101. Refer to the user interface 202 in FIG. 4D. In this way, the user can continue browsing, on the device 101, the web page on the device 102, thereby implementing cross-device task processing.

It should be noted that, in this embodiment of this application, specific styles of the task card 2921, the application label 2922, the label 2923 of the device to which the task belongs, the time label 2924, and the like and a relative position between the task card 2921, the application label 2922, the label 2923 of the device to which the task belongs, the time label 2924, and the like in the multi-task management interface may be in any possible form. This is not limited in this application.

In still another implementation, the foregoing manners of displaying based on the application dimension and displaying in the time sequence may be combined. In this display manner, for the plurality of task records that are from different electronic devices and that are aggregated based on the application dimension, time of one task corresponding to the task records may be used as time for display in the time sequence according to a preset rule. For example, one of time corresponding to the plurality of tasks closest to a current time point during sorting may be used as time of the group of task records displayed in a stacked manner.

Figure 4N:
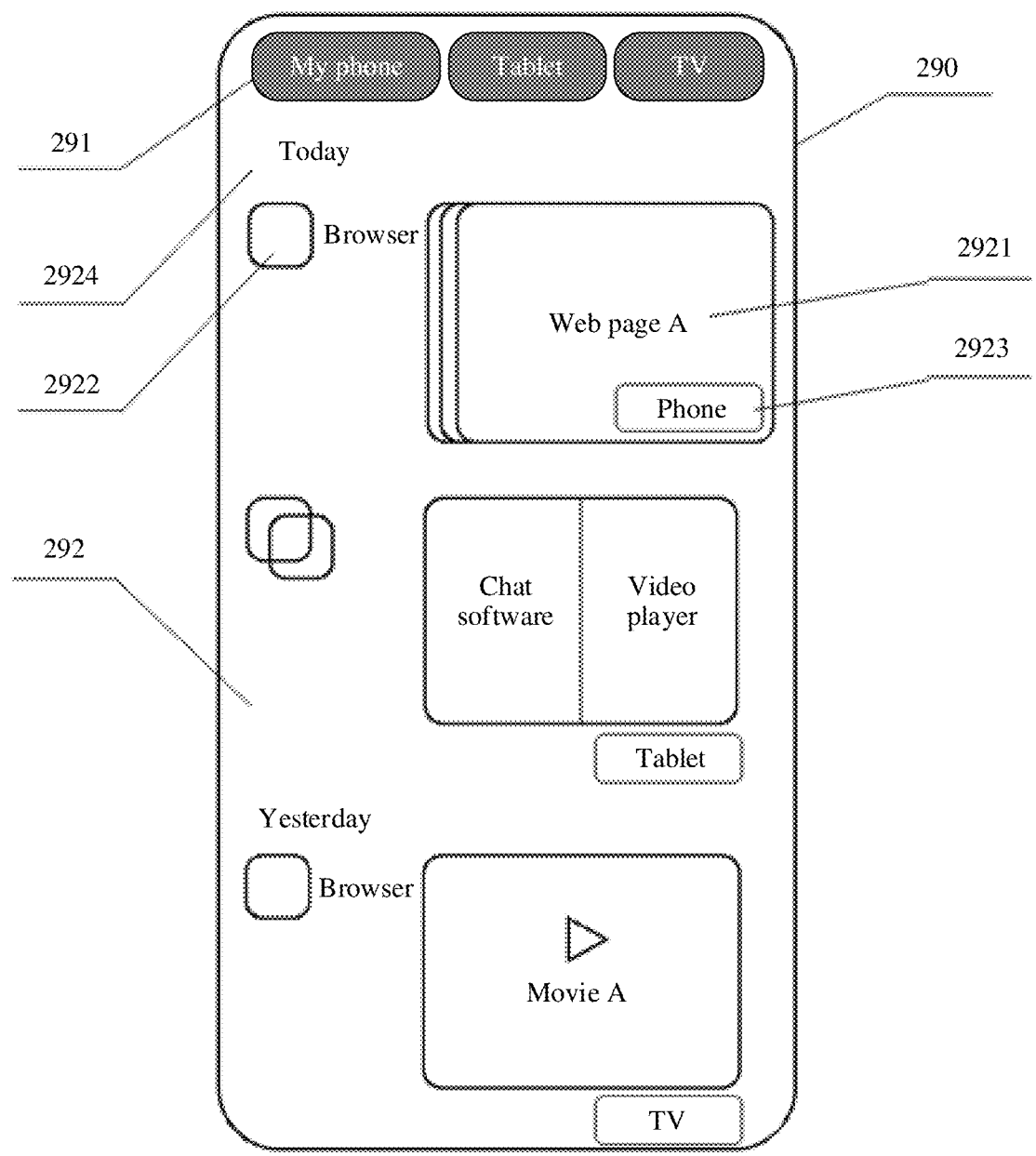
FIG. 4N is a schematic diagram of a seventh example of a multi-task management interface of a device 101 according to an embodiment of this application.

For example, FIG. 4N is a schematic diagram of a seventh example of the multi-task management interface of the device 101 according to this embodiment of this application. The example in FIG. 4N is similar to the example in FIG. 4M. In the two examples, the device label "My phone" corresponding to the device 101, the device label "Tablet" corresponding to the device 102, and the device label "TV" corresponding to the device 102 are all selected, and the task records are displayed in a time sequence. A difference between the two examples lies in that, in the example in FIG. 4N, because the same browser is installed on each of the device 101, the device 102, and the device 103, and a task in the browser is recorded in a historical task record of each of the device 101, the device 102, and the device 103, browser-related task cards 2921 from the three different electronic devices need to be stacked together and presented to the user in the second area 292. Because time at which the user last performs an operation on the "Web page A" is later than time at which the user last performs an operation on the "Web page B" and time at which the user performs an operation on the "Web page C", the time at which the user last performs the operation on the "Web page A" is determined as time used for sorting the three stacked task cards. Based on this, a display effect in the second area 292 is shown in FIG. 4N.

Optionally, in the multi-task management interface in this embodiment of this application, a privacy setting operation may be performed on a device label on the first electronic device, so that some or all of the second electronic devices skip displaying a historical task record of the first electronic device, so as to meet a temporary privacy requirement of the first electronic device.

In an implementation, an eighth operation is performed on one or more second labels, so that the second electronic devices corresponding to the second labels on which the eighth operation is performed skips displaying the historical task record of the first electronic device.

The eighth operation may be any preset operation, for example, touching and holding. A specific form of the eighth operation is not limited in this embodiment of this application. Generally, because the user also needs to perform an operation on the device label when selecting or deselecting the second label, in order to avoid confusion, the operation of selecting or deselecting the second label and the eighth operation may be set to be different operations.

Figure 4O:
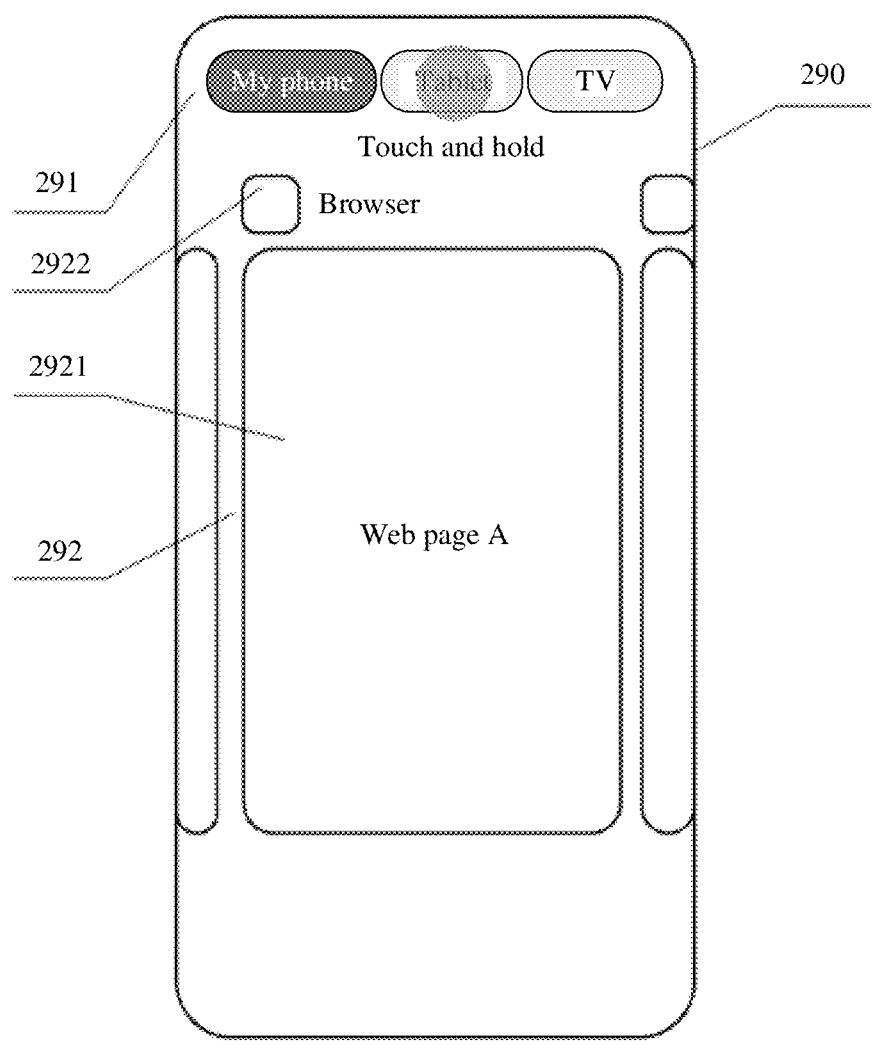
FIG. 4O is a schematic diagram of an eighth example of a multi-task management interface of a device 101 according to an embodiment of this application.
Figure 4P:
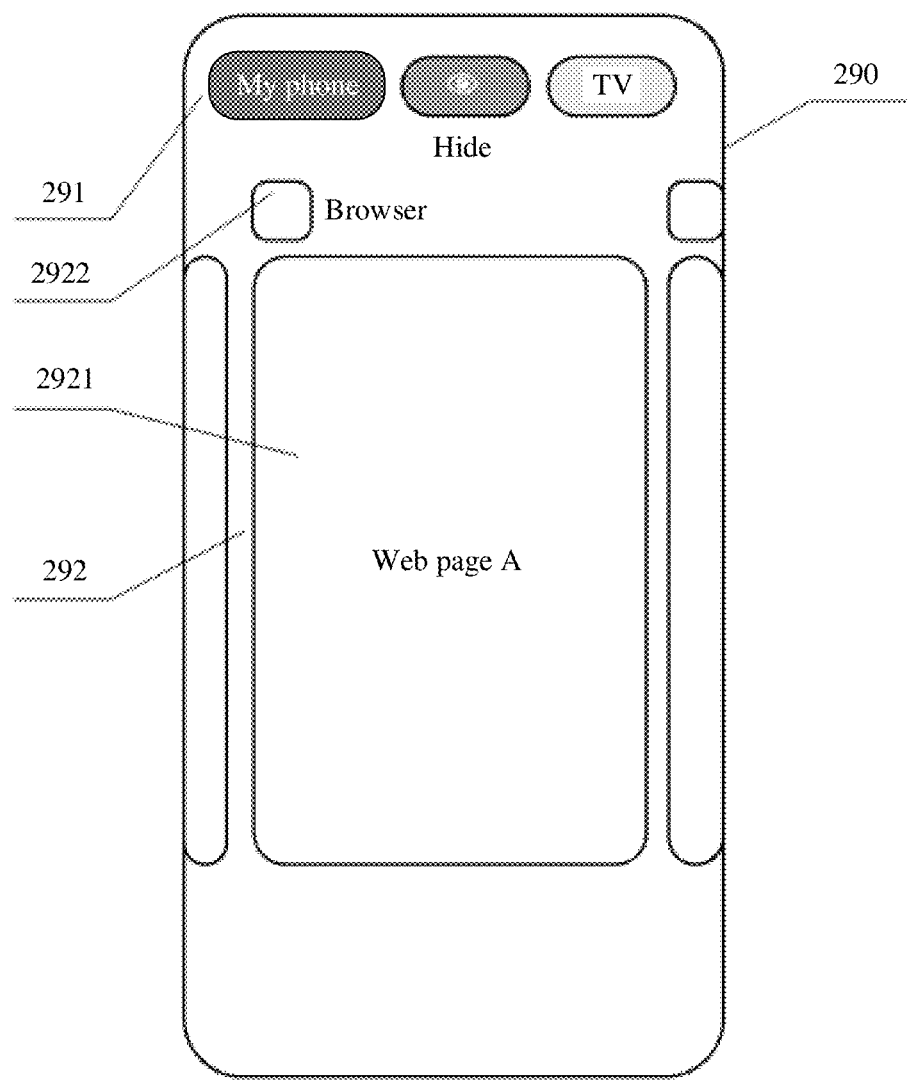
FIG. 4P is a schematic diagram of a ninth example of a multi-task management interface of a device 101 according to an embodiment of this application.

For example, FIG. 4O is a schematic diagram of an eighth example of the multi-task management interface of the device 101 according to this embodiment of this application; and FIG. 4P is a schematic diagram of a ninth example of the multi-task management interface according to this embodiment of this application. In the first area 291 in the multi-task management interface 290 in FIG. 4O, the device label "My phone" corresponding to the device 101 is selected, so that the historical task record of the device 101, for example, the web page "Web page A", is displayed in the second area 292. The user may also enter, on the device 102, a multi-task management interface of the device 102, and the interface is similar to the multi-task management interface of the device 101. Details are not described herein again. Historical task records of the device 101, the device 103, and the device 102 may be viewed in the multi-task management interface of the device 102. If the user performs the eighth operation, for example, touching and holding, on the second label "Tablet" in the first area 291 in the multi-task management interface 290 of the device 101, a hidden icon is displayed around the second label "Tablet", as shown in FIG. 4P. In this case, the historical task record of the device 101 cannot be viewed in the multi-task management interface of the device 102.

In this manner, when the device 101 and the device 102 are currently used by different users, the user of the device 101 may temporarily perform privacy setting by performing the eighth operation, to prevent the current user of the device 102 from viewing the historical task record of the device 101. When the privacy setting does not need to be performed, the user may also press and hold in the first area 291 in the multi-task management interface 290 of the device 101 to cancel the privacy setting. In this way, the historical task record of the device 101 can be viewed in the multi-task management interface of the device 102.

In another implementation, a ninth operation is performed on the first label, so that all the second electronic devices skip displaying the historical task record of the first electronic device.

The ninth operation may be any preset operation, for example, touching and holding. A specific form of the ninth operation is not limited in this embodiment of this application.

Generally, because the user also needs to perform an operation on the device label when selecting or deselecting the first label, in order to avoid confusion, the operation of selecting or deselecting the first label and the ninth operation may be set to be different operations. The ninth operation and the eighth operation may be set to same operations, or may be set to different operations. This is not limited in this application.

Figure 4Q:
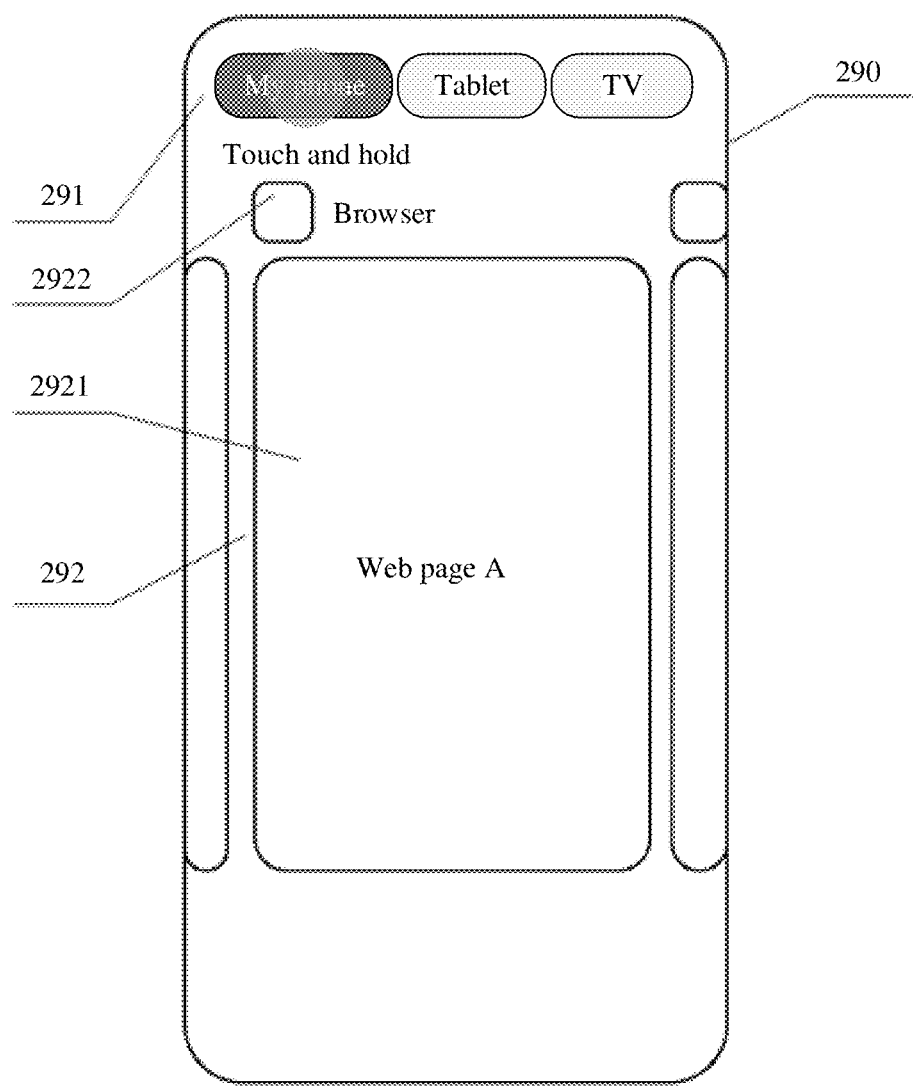
FIG. 4Q is a schematic diagram of a tenth example of a multi-task management interface of a device 101 according to an embodiment of this application.
Figure 4R:
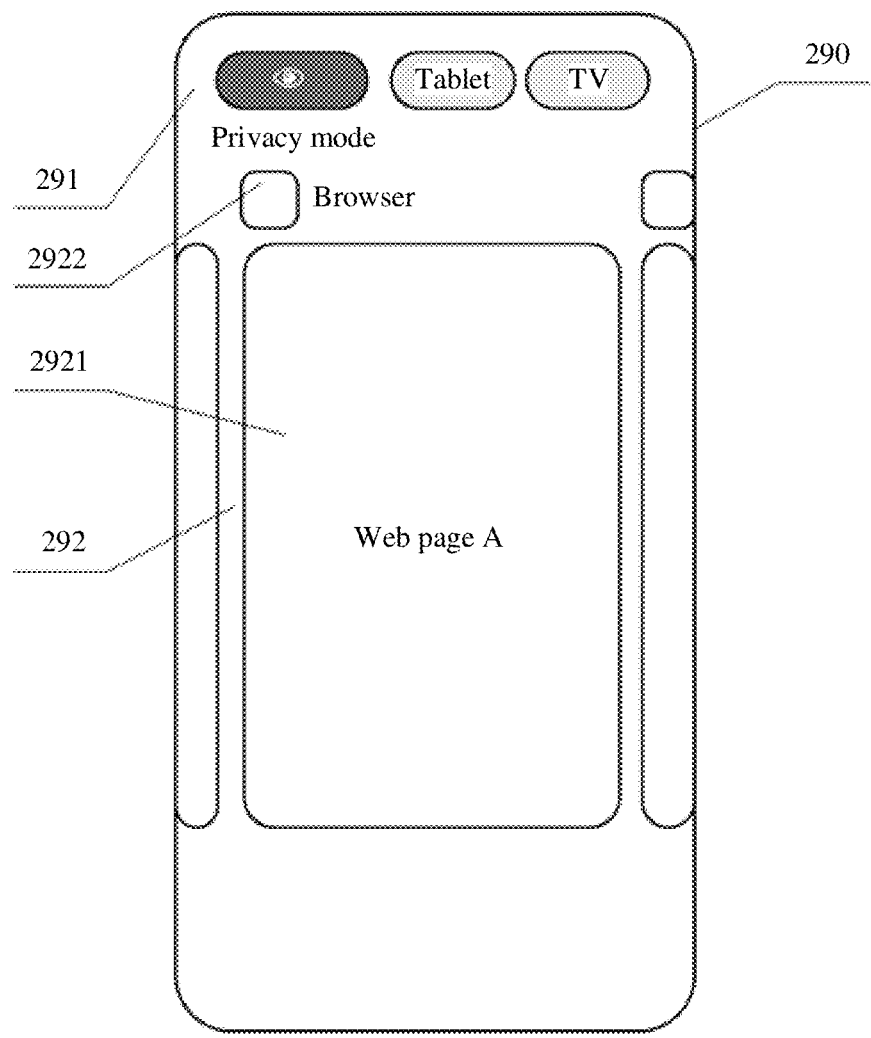
FIG. 4R is a schematic diagram of an eleventh example of a multi-task management interface of a device 101 according to an embodiment of this application.

For example, FIG. 4Q is a schematic diagram of a tenth example of the multi-task management interface of the device 101 according to this embodiment of this application; and FIG. 4R is a schematic diagram of an eleventh example of the multi-task management interface of the device 101 according to this embodiment of this application. If the user performs the ninth operation, for example, touching and holding, on the first label "My phone" in the first area 291 in the multi-task management interface 290 of the device 101, as shown in FIG. 4Q, a hidden icon is displayed around the first label "My phone", as shown in FIG. 4R. In this case, the historical task record of the device 101 cannot be viewed in multi-task management interfaces of other devices, for example, the device 102 and the device 103, in the system other than the device 101.

In this manner, the user of the device 101 may temporarily perform privacy setting by performing the ninth operation, to prevent a current user of the second electronic device such as the device 102 from viewing the historical task record of the device 101. When the privacy setting does not need to be performed, the user may also press and hold the first electronic device in the first area 291 in the multi-task management interface 290 of the device 101 to cancel the privacy setting. In this way, the historical task record of the device 101 can be viewed by the second electronic devices such as the device 102 and the device 103.

Embodiment 2

In this embodiment, the target device is any one of the second electronic devices, and the source device may be the first electronic device, or may be any second electronic device different from the target device.

First, the first electronic device receives the first operation performed by the user, and the first electronic device displays the multi-task management interface in response to the first operation.

For the first operation and the multi-task management interface, refer to related descriptions in Embodiment 1. Details are not described herein again.

Then, the first electronic device receives the sharing operation performed by the user on the first task record. The first electronic device enables, in response to the sharing operation, the target device to display the at least one task corresponding to the first task record.

In this embodiment, because the source device may be the first electronic device, or may be the any second electronic device different from the target device, the first task record is any task record in a historical task record of the first electronic device or the any second electronic device different from the target device.

After determining the task record corresponding to the task expected to be processed across devices, namely, the first task record, the user may perform the sharing operation on the task record, so that the first electronic device displays the at least one task corresponding to the first task record.

The second electronic device used as the target device displays the at least one task corresponding to the first task record in a plurality of different display manners. Correspondingly, the user may perform different sharing operations, so that the first electronic device can identify, based on the different sharing operations, a manner in which the user expects the second electronic device to perform displaying.

In an implementation, the user may perform a third operation on the first task record and a device label corresponding to any second electronic device. The first electronic device enables, in response to the third operation, the second electronic device corresponding to the third operation to display the at least one task corresponding to the first task record.

The third operation may be any preset operation, for example, dragging. A specific form of the third operation is not limited in this embodiment of this application. The third operation may be one operation, or may be an operation combination including a plurality of operations, for example, touching and holding+dragging. This is not limited in this application either. To avoid confusion, the third operation and the second operation in Embodiment 1 may be set to different operations.

Figure 5A:
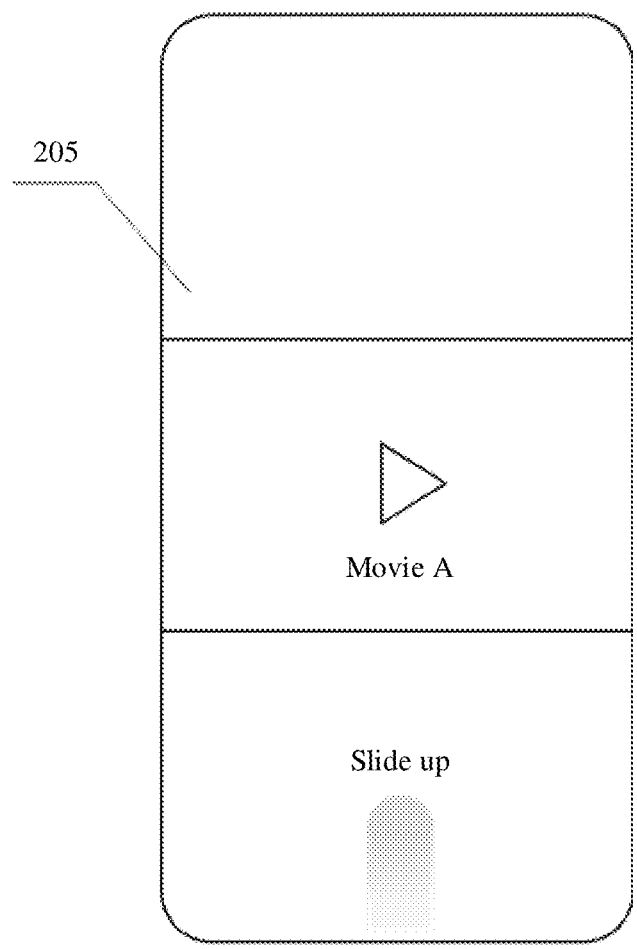
FIG. 5A is a schematic diagram of a third example of a user interface displayed on a device 101 before a first operation is performed.
Figure 5B:
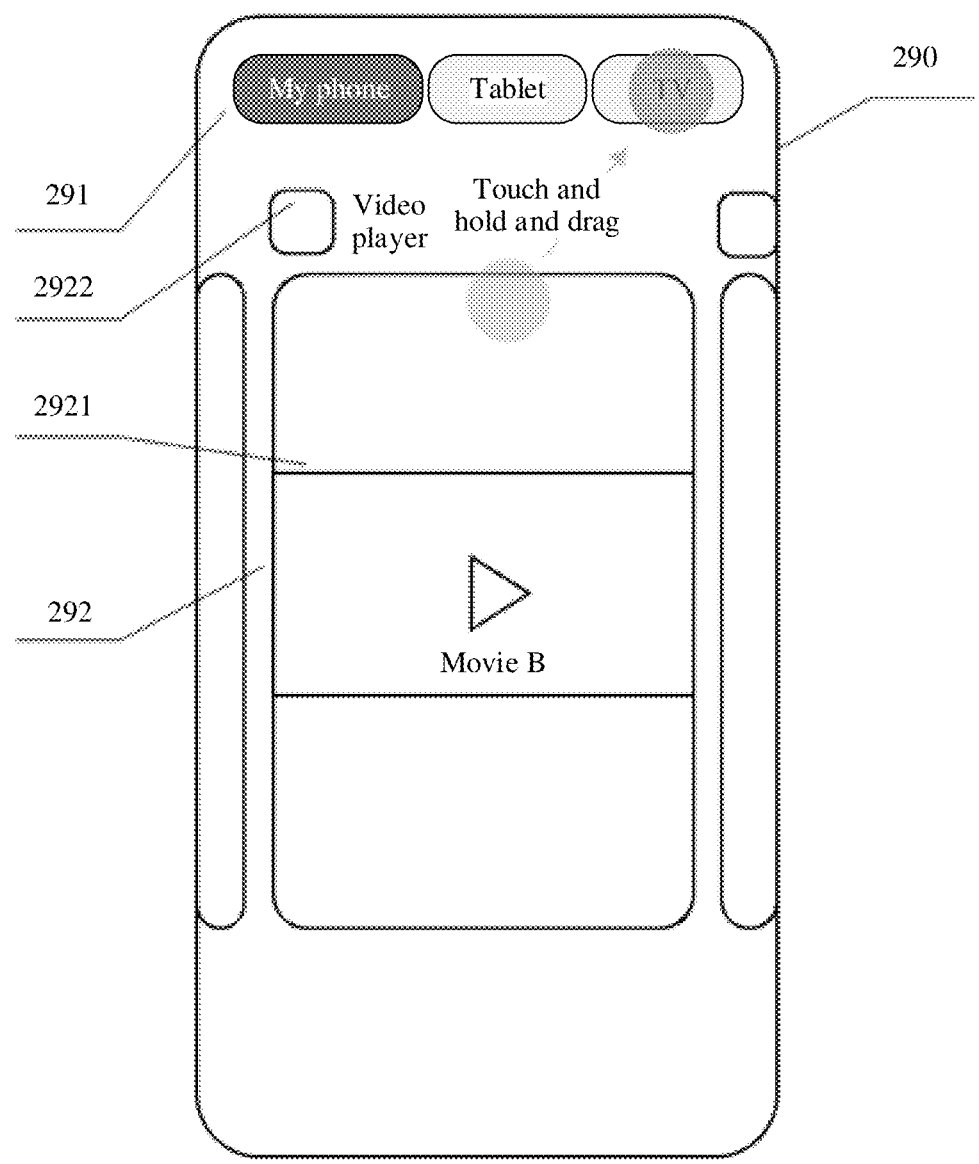
FIG. 5B is a schematic diagram of a twelfth example of a multi-task management interface of a device 101 according to an embodiment of this application.
Figure 5C:
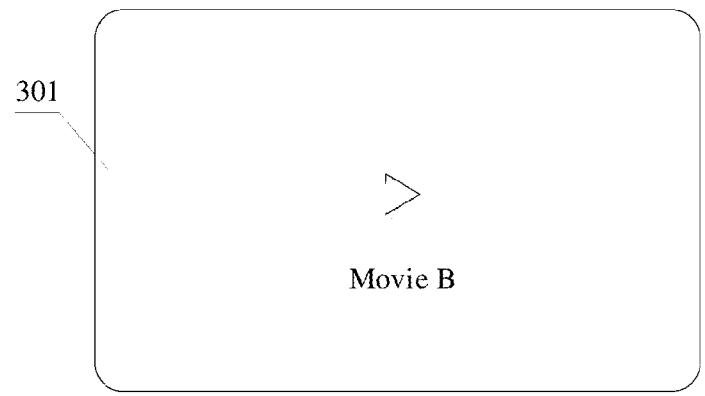
FIG. 5C is a schematic diagram of a first example of a user interface displayed on a device 103 after a third operation is performed according to an embodiment of this application.

For example, refer to FIG. 5A to FIG. 5C. FIG. 5A is a schematic diagram of a third example of the user interface displayed on the device 101 before the first operation is performed;

FIG. 5B is a schematic diagram of the twelfth example of the multi-task management interface of the device 101 according to this embodiment of this application; and FIG. 5C is a schematic diagram of a first example of a user interface displayed on the device 103 after the third operation is performed according to this embodiment of this application.

It can be seen from FIG. 5A that the user interface 205 displays a page "Movie A" in a video application software on the device 101. The user performs the first operation in the user interface 205, for example, slides up from a bottom of the user interface 205. After receiving the first operation, the device 101 displays the multi-task management interface 290 in response to the first operation, as shown in FIG. 5B. Similar to the multi-task management interface in Embodiment 1, the multi-task management interface 290 also includes the first area 291 and the second area 292. Because the device corresponding to the currently selected first label "My phone" in the first area 291 is the device 101, the second area 292 displays the historical task record of the device 101, namely, the task card 2921. In the second area 292, the user may slide left or right to view the another task card 2921, so as to select a task that the user wants to continue processing on the first electronic device or the another second electronic device.

Assuming that the user wants to share the task "Movie B" on the device 102 with the device 103, the user performs the third operation on the multi-task management interface 290 of the device 101. For example, the user touches and holds a task card of "Movie B", and then drags the "Movie B" to the device label "TV" corresponding to the device 103 in the first area 291. The device 101 receives the third operation, and shares, in response to the third operation, the task of the video "Movie B" in the video application software with the device 103. The device 103 displays the user interface 301 of the task, as shown in FIG. 5C. In this way, the user can continue watching, on the device 103, the video on the device 101, thereby implementing cross-device task processing.

Figure 5D:
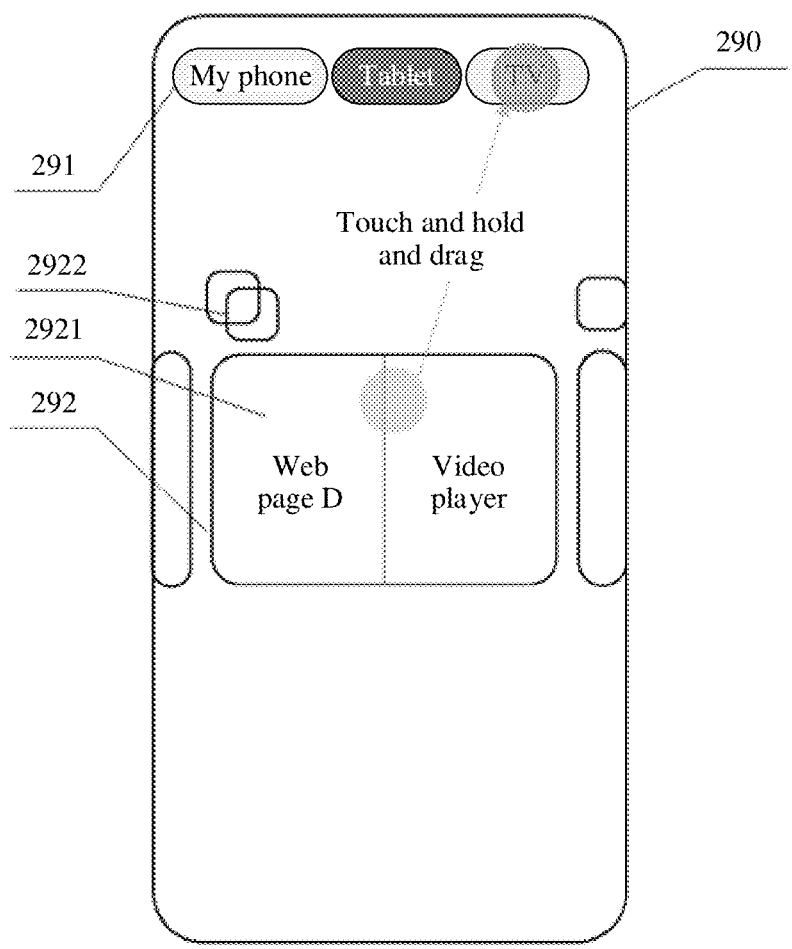
FIG. 5D is a schematic diagram of a thirteenth example of a multi-task management interface of a device 101 according to an embodiment of this application.
Figure 5E:
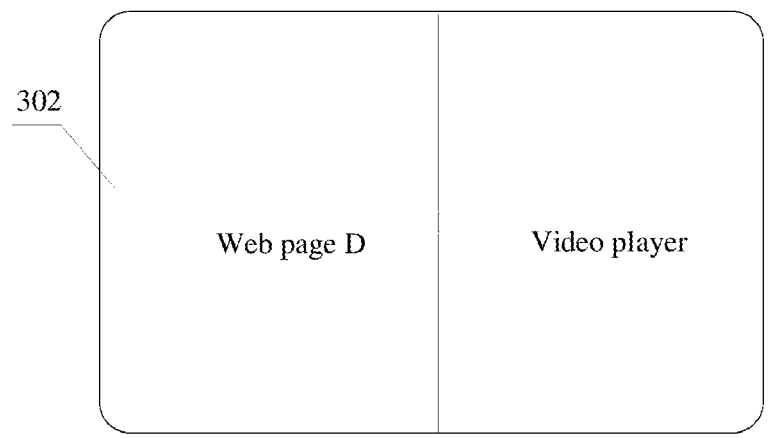
FIG. 5E is a schematic diagram of a second example of a user interface displayed on a device 103 after a third operation is performed according to an embodiment of this application.

For another example, FIG. 5D is a schematic diagram of a thirteenth example of the multi-task management interface of the device 101 according to this embodiment of this application; and FIG. 5E is a schematic diagram of a second example of the user interface displayed on the device 103 after the third operation is performed according to this embodiment of this application.

The user performs the first operation on any user interface of the display of the device 101, and enters the multi-task management interface 290, as shown in FIG. 5B. Then, the user selects one or more device labels in the first area 291. In the example shown in FIG. 5D, the device label selected by the user is the second label "Tablet", and the second area 292 displays the historical task record of the device 102, namely, a task card 2921, and the like. In the second area 292, the user may slide left or right to view the another task card 2921, so as to select the task that the user wants to continue processing on the first electronic device or the another second electronic device.

Assuming that the user wants to share two related tasks on the device 102, namely, a web page "Web page D" and a video player, with the device 103, the user performs the third operation on the multi-task management interface 290 of the device 101. For example, the user touches and holds the task card 2921 including the two related tasks, and then drags the tasks to the device label "TV" corresponding to the device 103 in the first area 291. The device 101 receives the third operation, and shares, in response to the third operation, the two related tasks with the device 103. The device 103 displays the user interface 302 of the tasks, as shown in FIG. 5E. In this way, the user can continue browsing, on the device 103, the web page "Web page D" on the device 102 and watching a video in a split-screen manner, thereby implementing cross-device task processing.

It should be noted that when the first task record corresponds to the plurality of tasks, the target device may support running of only some of the tasks in some cases. In this case, the target device may not display tasks that are not supported by the target device, but display the plurality of tasks supported by the target device only in a split-screen form, or separately display one task supported by the target device.

For example, a video player is installed but a browser is not installed on the device 103. In this case, if the user performs the third operation in the multi-task management interface 290 shown in FIG. 5D, for example, touches and holds the task card 2921 including the two related tasks, and then drags the tasks to the device label "TV" corresponding to the device 103 in the first area 291, even if the device 103 obtains data for running of the web page "Web page D", because the browser is not installed on the device 103 and the device 103 does not support running the web page "Web page D", the device 103 cannot display a user interface for running the web page "Web page D". In this case, the device 103 displays only a user interface of the video player.

In another display manner, the user may perform a seventh operation on the first task record and a device label corresponding to the any second electronic device. The first electronic device enables, in response to the seventh operation, the second electronic device corresponding to the seventh operation to display, in a split-screen form, a task running in a foreground of the second electronic device and the at least one task corresponding to the first task record.

The seventh operation may be any preset operation. A specific form of the seventh operation is not limited in this embodiment of this application. The seventh operation may be one operation, or may be an operation combination including a plurality of operations, for example, double tapping+dragging. This is not limited in this application either. Generally, to avoid confusion, the seventh operation and the third operation should be set to different operations. The seventh operation and the sixth operation in Embodiment 1 may also be set to same operations or different operations. This is not limited in this application either.

In this application, operations such as the sixth operation and the seventh operation may be collectively referred to as split-screen operations. The split-screen operation may be an operation for the first task record and the device label corresponding to the target device. The split-screen operation is used to enable the target device to display, in a split-screen form, the at least one task corresponding to the first task record and the task running in the foreground of the target device.

In still another display manner, the user may perform a fifth operation on a file in the first task record and the device label corresponding to the any second electronic device. The first electronic device enables, in response to the fifth operation, the second electronic device corresponding to the fifth operation to receive the file in the first task record. In addition, if an application that can open the file is installed on the second electronic device corresponding to the fifth operation, the second electronic device is enabled to display the file.

When there are a plurality of second electronic devices in the multi-device system, there are a plurality of possible target devices in this embodiment. Based on this, the fifth operation is performed, so that the first electronic device can determine, based on the received fifth operation, that the specific second electronic device is the target device that the user expects to select.

Figure 5F:
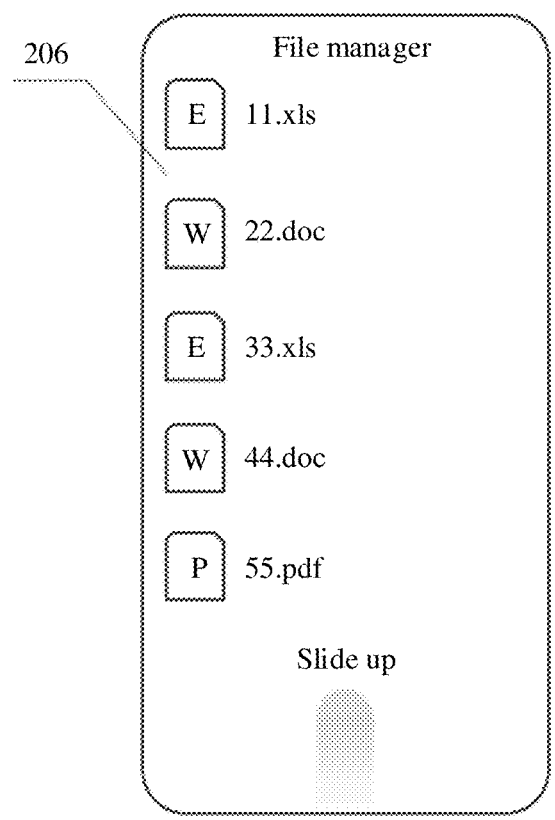
FIG. 5F is a schematic diagram of a fourth example of a user interface displayed on a device 101 before a first operation is performed.
Figure 5G:
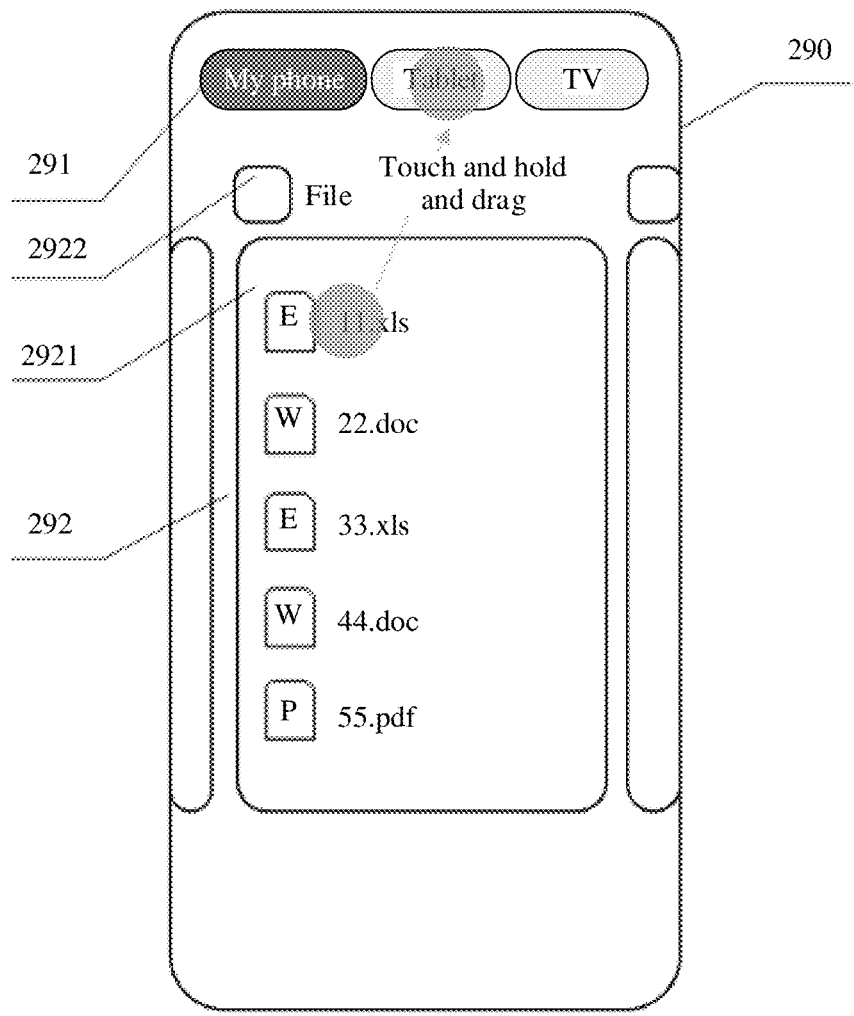
FIG. 5G is a schematic diagram of a fourteenth example of a multi-task management interface according to an embodiment of this application.
Figure 5H:
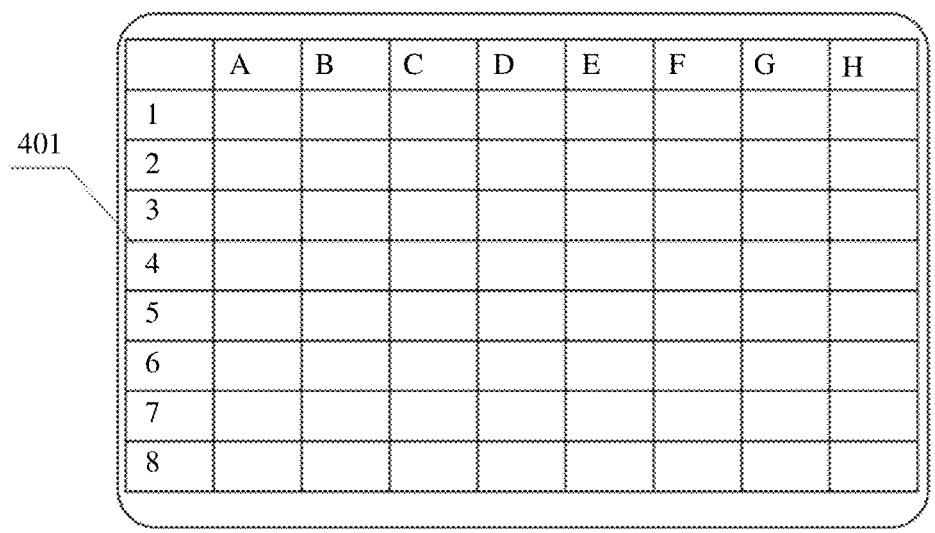
FIG. 5H is a schematic diagram of a first example of a user interface displayed on a device 102 after a fifth operation is performed according to an embodiment of this application.

Refer to FIG. 5F to FIG. 5H. FIG. 5F is a schematic diagram of a fourth example of the user interface displayed on the device 101 before the first operation is performed; FIG. 5G is a schematic diagram of a fourteenth example of the multi-task management interface according to this embodiment of this application; and FIG. 5H is a schematic diagram of a first example of the user interface displayed on the device 102 after the fifth operation is performed according to this embodiment of this application.

It can be seen from FIG. 5F that the user interface 206 displays a file manager interface of the device 101. The user performs the first operation in the user interface 206, for example, slides up from a bottom of the user interface 206. After receiving the first operation, the device 101 displays the multi-task management interface 290 in response to the first operation, as shown in FIG. 5G. Because the device corresponding to the currently selected first label "My phone" in the first area 291 is the device 101, the second area 292 displays the historical task record of the device 101, namely, the task card 2921. In the second area 292, the user may slide left or right to view another task card 2921. The user may select data in a task from the task card 2921, and transmit the data to another appropriate device for further processing.

Assuming that the user wants to share, with the device 102, a file "11.xls" in the file manager interface of the historical task record of the device 101, the user performs the fifth operation in the multi-task management interface 290 of the device 101. For example, the user presses and holds "11.xls" in the file manager task card to select the file, and then drags the file to the device label "Tablet" corresponding to the device 102 in the first area 291. The device 101 receives the fifth operation, and transmits, in response to the fifth operation, the file "11.xls" in the file manager interface to the device 102. If the application that can open the file is installed on the device 102, the file "11.xls" is directly opened, and the user interface 401 which opens the file is displayed, as shown in FIG. 5H. In this way, the user can continue processing the "11.xls" file on the device 102, thereby implementing cross-device task processing. If no application that can open the file "11.xls" is currently installed on the device 102, the device 102 receives the file and then stores the file in the device 102, and waits for a subsequent operation of the user.

In this application, operations such as the fourth operation and the fifth operation may be collectively referred to as transmission operations. The transmission operation may be an operation for the first task record and the device label corresponding to the target device. The transmission operation is used to enable the target device to receive the file in the first task record corresponding to the transmission operation.

The method in this embodiment is performed, and the first electronic device can share the task or the file in the task on the first electronic device or a second electronic device with another second electronic device, so that the user can select the more appropriate second electronic device to process the task or the file in the task.

It should be noted that the method for displaying the plurality of task records, the privacy setting method, the method for displaying the one or more related tasks corresponding to the first task record, the method for obtaining, by the target device from the source device, the data required for running the task, and the like in Embodiment 1 may also be applied to this embodiment.

Embodiment 3

The foregoing embodiments describe the solutions of the interaction methods provided in this application from perspectives of a hardware structure, a software architecture, and steps performed by software and hardware of the electronic device. A person skilled in the art should be easily aware that, with reference to the steps described in the foregoing embodiments, the interaction method in this application may be implemented not only in a form of hardware or computer software, but also in a form of a combination of hardware and computer software. How a function is implemented depends on a specific application and a design constraint of the technical solution.

Figure 6:
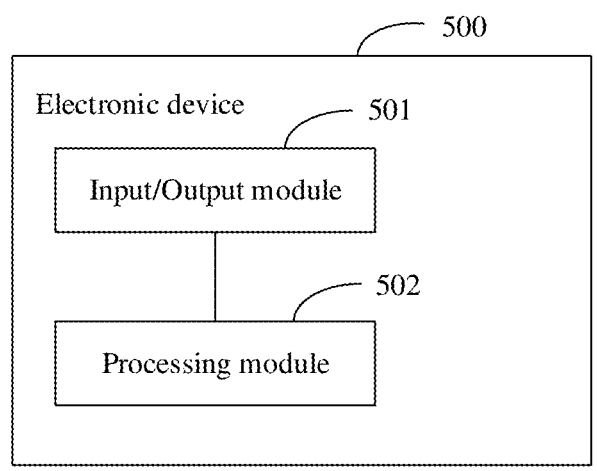
FIG. 6 is a schematic diagram of a structure of an implementation of an electronic device according to an embodiment of this application.

This embodiment provides an electronic device. In an implementation, the electronic device may be divided into function modules. When the function modules are obtained through division based on functions, FIG. 6 is a schematic diagram of a structure of an implementation of the electronic device according to this application. The electronic device 500 includes at least one input/output module 501 and at least one processing module 502.

The at least one input/output module 501 is configured to: display a multi-task management interface, and receive a sharing operation performed by a user on a first task record in the multi-task management interface, where the multi-task management interface includes N device labels and at least one task record, the N device labels correspond to N electronic devices respectively, N is a positive integer greater than 1, the first task record is any one of task records of the source device, and the source device is any one of the N electronic devices.

The at least one processing module 502 is configured to enable, in response to the sharing operation, the target device to display the at least one task corresponding to the first task record, where the target device is any one of the N electronic devices, and the target device is different from the source device.

Optionally, the at least one processing module 502 is further configured to display, in response to a second operation performed by the user on the first task record, the at least one task corresponding to the first task record.

Optionally, the N electronic devices include at least one second electronic device. The at least one processing module 502 is further configured to enable, in response to a third operation performed by the user on the first task record and a device label corresponding to any second electronic device, the second electronic device corresponding to the third operation to display the at least one task corresponding to the first task record.

Optionally, the at least one processing module 502 is further configured to: when the first task record corresponds to at least two related tasks, enable, in response to the sharing operation, the target device to display the at least two related tasks in a split-screen form, where the related tasks are tasks displayed in a split-screen form on the source device.

Optionally, the at least one processing module 502 is further configured to enable, in response to the split-screen operation performed by the user on the first task record and the device label corresponding to the target device, the target device to display, in the split-screen form, the at least one task corresponding to the first task record and the task running in the foreground of the target device.

Optionally, the at least one processing module 502 is further configured to enable, in response to a transmission operation performed by the user on a file in the first task record and the device label corresponding to the target device, the target device to receive the file.

Optionally, the at least one input/output module 501 is further configured to: receive a first operation performed by the user; and display the multi-task management interface in response to the first operation.

Optionally, the at least one input/output module 501 is further configured to: receive a selection operation performed by the user on the device label, and display at least one task record of an electronic device corresponding to the selected device label.

Optionally, when more than one device label is selected in the multi-task management interface, and at least one same application is installed on the electronic devices respectively corresponding to the selected device labels, the multi-task management interface displays, by category based on the at least one same application, task records of the electronic devices respectively corresponding to the selected device labels.

Optionally, when more than one device label is selected in the multi-task management interface, the multi-task management interface displays, in a time sequence, task records of the electronic devices respectively corresponding to the selected device labels.

Optionally, the N device labels include a first label corresponding to the first electronic device and at least one second label corresponding to the second electronic device.

Optionally, the at least one processing module 502 is further configured to enable, in response to an eighth operation performed by the user on the at least one second label, the second electronic device corresponding to the second label corresponding to the eighth operation to skip displaying the task record of the first electronic device.

Optionally, the at least one processing module 502 is further configured to enable, in response to a ninth operation performed by the user on the first label, all the second electronic devices to skip displaying the task record of the first electronic device.

It may be understood that, division into the function modules of the electronic device in this embodiment is an example, and is merely logical function division. In actual implementation, another division manner may be used. For example, a function of the input/output module 501 may be integrated into a touchscreen for implementation, and a function of the processing module 502 may be integrated into a processor for implementation.

Figure 7:
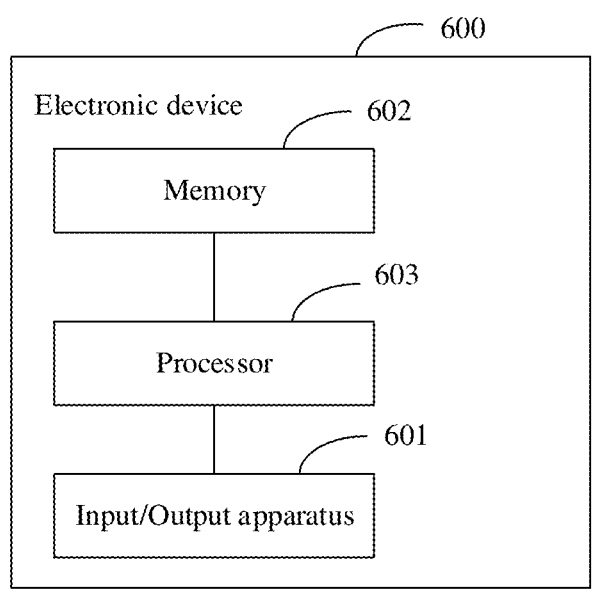
FIG. 7 is a schematic diagram of a structure of another implementation of an electronic device according to an embodiment of this application.

In another implementation of the electronic device, function entities that run independently may be integrated into one hardware entity. FIG. 7 is a schematic diagram of a structure of another implementation of the electronic device according to this application. FIG. 7 describes the electronic device in this application from a perspective of an independent functional entity. The electronic device 600 may include at least one input/output apparatus 601, at least one memory 602, and at least one processor 603.

The at least one input/output apparatus 601 is configured to receive an operation performed by the user and present information to the user. In actual application, the input/output apparatus 601 may include one or a combination of more of a touchscreen, an input keyboard, a display, a holographic projection device, a virtual reality device, and the like.

The at least one memory 602 stores one or more computer programs or instructions. The memory 602 may include a volatile memory (volatile memory), for example, a random access memory (random access memory, RAM); and may further include a non-volatile memory (non-volatile memory), for example, a flash memory (flash memory), a hard disk drive (hard disk drive, HDD), or a solid-state drive (solid-state drive, SSD). The memory 602 may further include a combination of the foregoing types of memories. The memory 602 may store computer-executable programs or instructions. For example, the memory 602 may be the same as the internal memory 121.

The processor 603 executes the instructions stored in the memory 602, to implement a function or data processing of the electronic device. For example, the processor 603 executes the programs or instructions stored in the memory 602, so that the electronic device 600 implements some or all steps of any interaction method.

The processor 603 may include one or more processing units. For example, the processor 603 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors. The processor 603 may further include a hardware chip. The foregoing hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL for short), or any combination thereof. For example, the processor 603 may be the same as the processor 110.

An embodiment further provides a computer-readable storage medium. The computer-readable storage medium is configured to store computer programs or instructions. When the computer programs or instructions are run on an electronic device, the electronic device is enabled to perform some or all of the steps of any method performed by the first electronic device in Embodiment 1 or Embodiment 2.

The readable storage medium herein may be a magnetic disk, an optical disc, a DVD, a USB, a read-only memory (ROM), a random access memory (RAM), or the like. A specific storage medium form is not limited in this application.

All or some of foregoing method embodiments may be implemented by using software, hardware, firmware, or any combination thereof. When software is used to implement embodiments, all or some of embodiments may be implemented in a form of a computer program product. The computer program product includes one or more computer instructions.

When the computer program instructions are loaded and executed on the computer, all or some of the procedures or functions in this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid-State Drive, SSD)), or the like.

It should be understood that, in various embodiments of this application, an execution sequence of each step should be determined based on a function and internal logic of the step. A sequence number of each step does not mean an execution sequence, and does not constitute a limitation on an implementation process of embodiments.

Unless otherwise stated, "a plurality of" in this specification means two or more. In embodiments of this application, words such as "first" and "second" are used to distinguish between same items or similar items having basically same functions and effects. A person skilled in the art may understand that words such as "first" and "second" do not constitute a limitation on a quantity or an execution sequence, and words such as "first" and "second" do not indicate a necessary difference either.

It should be further understood that implementations of embodiments in this specification may be combined with each other provided that they do not logically conflict with each other. For same or similar parts in embodiments, refer to each other. Particularly, embodiments of the electronic device, the computer-readable storage medium, and the computer program product are basically similar to the method embodiments, and therefore are described briefly. For related parts, refer to descriptions in the method embodiments. The foregoing implementations are not intended to limit the protection scope of this application.

What is claimed is:

1. An interaction method, comprising:
    displaying, by a first electronic device, a first user interface of a first application;
    receiving, by the first electronic device, an upward sliding operation initiated from a bottom of the first user interface;
    displaying, by the first electronic device, in response to the upward sliding operation, a multi-task management interface, wherein the multi-task management interface comprises a first device label of the first electronic device and a second device label of a second electronic device, and wherein the first electronic device and the second electronic device are connected in a near field communications manner;

displaying, by the first electronic device, a first task card of the first application in the multi-task management interface in response to the first device label being a selected device label in the multi-task management interface while the first application is running in the first electronic device;

receiving, by the first electronic device, a first sliding operation in the multi-task management interface;

displaying, by the first electronic device, a second task card of a second application in the multi-task management interface, wherein the second application is running in a background of the first electronic device;

receiving, by the first electronic device, a selecting operation of the second device label in the multi-task management interface;

displaying, by the first electronic device, in the multi-task management interface, a third task card of a third application running on the second electronic device;

receiving, by the first electronic device, a second sliding operation in the multi-task management interface; and displaying, by the first electronic device, in the multi-task management interface, a fourth task card of a fourth application running on the second electronic device.

2. The method according to claim 1, wherein the second task card comprises a thumbnail corresponding to a second task of the second application.

3. The method according to claim 2, wherein the thumbnail corresponding to the second task and the second task card is generated at a time point closest to a current time point.

4. The method according to claim 2, wherein the multi-task management interface comprises a fifth task card, and wherein the fifth task card corresponds to a fifth task and a sixth task operating on the first electronic device in a split-screen form; and wherein the method further comprises:
receiving, by the first electronic device, a first operation performed by a user on the fifth task card on the multi-task management interface, wherein the first operation is dragging the fifth task card to the second device label; and enabling, by the first electronic device, in response to the first operation, the second electronic device to display a third user interface corresponding to the fifth task card with the fifth task and the sixth task in a split-screen form.

5. The method according to claim 4, wherein displaying the third user interface comprises displaying the third user interface with the fifth task and the sixth task in a left-right split-screen form or up-down split-screen form.

6. The method according to claim 1, further comprising:
receiving, by the first electronic device, a dragging operation performed on the first task card to the second device label; and enabling, by the first electronic device, in response to the dragging operation, the second electronic device to display a first user interface corresponding to the first task card.

7. The method according to claim 1, further comprising:
receiving, by the first electronic device, a tap operation performed on the second task card; and displaying, by the first electronic device, in response to the tap operation, a second user interface corresponding to the second task card and different from the first user interface.

8. The method according to claim 7, further comprising performing, before the displaying the third task card:

obtaining, by the first electronic device, from the second electronic device, second data associated with running the third task card in the first electronic device.

9. The method according to claim 1, further comprising performing, before the displaying the third task card of the third application in the multi-task management interface:

obtaining, by the first electronic device, from the second electronic device, first data associated with displaying the third task card.

10. The method according to claim 1, wherein the multi-task management interface comprises N device labels including the first device label and the second device label, wherein N is an integer greater than or equal to 3, wherein the N device labels further comprise a third device label corresponding to a third electronic device; and wherein the method further comprises:
enabling, by the first electronic device, in response to a fourth operation performed by the user on the third device label, the third electronic device to skip displaying task records of the first electronic device.

11. The method according to claim 4, wherein a split-screen display manner of the fifth task and the sixth task in the first electronic device is different from a split-screen display manner of the fifth task and the sixth task in the second electronic device.

12. A first electronic device, comprising:
at least one input/output apparatus;
at least one processor; and
at least one non-transitory computer readable memory connected to the at least one processor and including computer program code, wherein the at least one non-transitory computer readable memory and the computer program code are configured, with the at least one processor, to cause the first electronic device to perform at least:

displaying a first user interface of a first application;
receiving an upward sliding operation initiated from a bottom of the first user interface;
displaying in response to the upward sliding operation, a multi-task management interface, wherein the multi-task management interface comprises a first device label of the first electronic device and a second device label of a second electronic device, and wherein the first electronic device and the second electronic device are connected in a near field communications manner;
displaying a first task card of the first application in the multi-task management interface in response to the first device label being a selected device label in the multi-task management interface while the first application is running in the first electronic device;
receiving a sliding operation in the multi-task management interface;
displaying a second task card of a second application in the multi-task management interface, wherein the second application is running in a background of the first electronic device;
receiving a selecting operation of the second device label in the multi-task management interface;
displaying, in the multi-task management interface, a third task card of a third application running on the second electronic device;
receiving a second sliding operation in the multi-task management interface; and
displaying, in the multi-task management interface, a fourth task card of a fourth application running on the second electronic device.

13. The first electronic device according to claim 12, wherein the second task card comprises a thumbnail corresponding to a second task of the second application.

14. The first electronic device according to claim 13, wherein the thumbnail corresponding to the second task and the second task card is generated at a time point closest to a current time point.

15. The first electronic device according to claim 13, wherein the multi-task management interface comprises a fifth task card, and wherein the fifth task card corresponds to a fifth task and a sixth task operating on the first electronic device in a split-screen form; and
 wherein the at least one non-transitory computer readable memory and the computer program code are configured, with the at least one processor, to cause the first electronic device to further perform:
  receiving a first operation performed by a user on the fifth task card on the multi-task management interface, wherein the first operation is dragging the fifth task card to the second device label; and
  enabling in response to the first operation, the second electronic device to display a third user interface corresponding to the fifth task card with the fifth task and the sixth task in a split-screen form.

16. The first electronic device according to claim 15, wherein displaying the third user interface comprises displaying the third user interface with the fifth task and the sixth task in a left-right split-screen form or up-down split-screen form.

17. The first electronic device according to claim 15, wherein a split-screen display manner of the fifth task and the sixth task in the first electronic device is different from a split-screen display manner of the fifth task and the sixth task in the second electronic device.

18. The first electronic device according to claim 12, wherein the at least one non-transitory computer readable memory and the computer program code are configured, with the at least one processor, to cause the first electronic device to further perform:
 receiving a dragging operation performed on the first task card to the second device label; and
 enabling, in response to the dragging operation, the second electronic device to display a first user interface corresponding to the first task card.

19. The first electronic device according to claim 12, wherein the at least one non-transitory computer-readable memory and the computer program code are configured, with the at least one processor, to cause the first electronic device to further perform:
 receiving a tap operation performed on the second task card; and
 displaying in response to the tap operation, a second user interface corresponding to the second task card and different from the first user interface.

20. The first electronic device according to claim 19, wherein the at least one non-transitory computer-readable memory and the computer program code are configured, with the at least one processor, to cause the first electronic device to further perform, before the displaying the third task card:
 obtaining, from the second electronic device, second data associated with running the third task card in the first electronic device.

21. The first electronic device according to claim 12, wherein the at least one non-transitory computer-readable memory and the computer program code are configured, with the at least one processor, to cause the first electronic device to further perform, before the displaying the third task card of the third application in the multi-task management interface:
 obtaining, from the second electronic device, first data associated with displaying the third task card.

22. The first electronic device according to claim 12, wherein the multi-task management interface comprises N device labels including the first device label and the second device label, wherein N is an integer greater than or equal to 3, wherein the N device labels further comprise a third device label corresponding to a third electronic device; and
 wherein the at least one non-transitory computer readable memory and the computer program code are configured, with the at least one processor, to cause the first electronic device to further perform:
  enabling, in response to a fourth operation performed by the user on the third device label, the third electronic device to skip displaying task records of the first electronic device.

23. A non-transitory computer-readable storage medium, storing a computer program for execution by a processor of a first electronic device, wherein the non-transitory computer-readable storage medium and the computer program are configured to cause the first electronic device to perform at least:
 displaying a first user interface of a first application;
 receiving an upward sliding operation initiated from a bottom of the first user interface;
 displaying in response to the upward sliding operation, a multi-task management interface, wherein the multi-task management interface comprises a first device label of the first electronic device and a second device label of a second electronic device, and wherein the first electronic device and the second electronic device are connected in a near field communications manner;
 displaying a first task card of the first application in the multi-task management interface in response to the first device label being a selected device label in the multi-task management interface while the first application is running in the first electronic device;
 receiving a sliding operation in the multi-task management interface;
 displaying a second task card of a second application in the multi-task management interface, wherein the second application is running in a background of the first electronic device;
 receiving a selecting operation of the second device label in the multi-task management interface;
 displaying, in the multi-task management interface, a third task card of a third application running on the second electronic device;
 receiving a second sliding operation in the multi-task management interface; and
 displaying, in the multi-task management interface, a fourth task card of a fourth application running on the second electronic device.

* * * * *

UNITED STATES PATENT AND TRADEMARK OFFICE
CERTIFICATE OF CORRECTION

| | | |
|---|---|---|
| PATENT NO. | : 12,455,672 B2 | |
| APPLICATION NO. | : 17/791428 | |
| DATED | : October 28, 2025 | |
| INVENTOR(S) | : Tian et al. | |

It is certified that error appears in the above-identified patent and that said Letters Patent is hereby corrected as shown below:

In the Specification

In Column 33, Lines 8-13, delete "Web page B" in FIG. 4M. The device 101 displays, in response to the second operation, the user interface of the task on the display of the device 101. Refer to the user interface 202 in FIG. 4D. In this way, the user can continue browsing, on the device 101, the web page on the device 102, thereby implementing cross-device task processing." and insert the same from Line 7, after "2921" as continuation of the paragraph.

In Column 34, Lines 16-35, delete "FIG. 4P is a schematic diagram of a ninth example of the multi-task management interface according to this embodiment of this application. In the first area 291 in the multi-task management interface 290 in FIG. 4O, the device label "My phone" corresponding to the device 101 is selected, so that the historical task record of the device 101, for example, the web page "Web page A", is displayed in the second area 292. The user may also enter, on the device 102, a multi-task management interface of the device 102, and the interface is similar to the multi-task management interface of the device 101. Details are not described herein again. Historical task records of the device 101, the device 103, and the device 102 may be viewed in the multi-task management interface of the device 102. If the user performs the eighth operation, for example, touching and holding, on the second label "Tablet" in the first area 291 in the multi-task management interface 290 of the device 101, a hidden icon is displayed around the second label "Tablet", as shown in FIG. 4P. In this case, the historical task record of the device 101 cannot be viewed in the multi-task management interface of the device 102." and insert the same from Line 15, after "and" as continuation of the paragraph.

In Column 36, Lines 12-18, delete "FIG. 5B is a schematic diagram of the twelfth example of the multi-task management interface of the device 101 according to this embodiment of this application; and FIG. 5C is a schematic diagram of a first example of a user interface displayed on the device 103 after the third operation is performed according to this embodiment of this application." and insert the same from Line 11, after "performed;" as continuation of the paragraph.

Signed and Sealed this
Twenty-third Day of December, 2025

John A. Squires
*Director of the United States Patent and Trademark Office*

CERTIFICATE OF CORRECTION (continued)
U.S. Pat. No. 12,455,672 B2

In the Claims

In Column 44, in Claim 12, Line 32, delete "computer readable" and insert -- computer-readable --.